United States Patent
Li et al.

(10) Patent No.: US 9,336,248 B2
(45) Date of Patent: May 10, 2016

(54) ANOMALY DETECTION IN CHAIN-OF-CUSTODY INFORMATION

(71) Applicant: The Boeing Company, Chicago, IL (US)

(72) Inventors: Mingyan Li, Bellevue, WA (US); Matthew Lee Benson, Tukwila, WA (US)

(73) Assignee: THE BOEING COMPANY, Chicago, IL (US)

(*) Notice: Subject to any disclaimer, the term of this patent is extended or adjusted under 35 U.S.C. 154(b) by 338 days.

(21) Appl. No.: 13/869,383

(22) Filed: Apr. 24, 2013

(65) Prior Publication Data
US 2014/0324786 A1    Oct. 30, 2014

(51) Int. Cl.
G06F 17/30 (2006.01)
G07C 5/08 (2006.01)

(52) U.S. Cl.
CPC ............ *G06F 17/30303* (2013.01); *G07C 5/08* (2013.01)

(58) Field of Classification Search
CPC .................................. G06F 17/30303
USPC ........................................ 707/690
See application file for complete search history.

(56) References Cited

U.S. PATENT DOCUMENTS

| | | | |
|---|---|---|---|
| 6,438,468 B1* | 8/2002 | Muxlow et al. | 701/3 |
| 6,725,137 B2 | 4/2004 | Eagleton et al. | |
| 6,816,762 B2* | 11/2004 | Hensey et al. | 701/32.6 |
| 7,330,819 B2 | 2/2008 | Sinex | |
| 7,636,568 B2* | 12/2009 | Gould et al. | 455/431 |
| 7,761,201 B2* | 7/2010 | Avery et al. | 701/29.3 |
| 7,945,360 B2* | 5/2011 | Nahapetian | 701/33.4 |
| 8,078,354 B2* | 12/2011 | Loda | 701/33.4 |
| 8,204,637 B1* | 6/2012 | Everson et al. | 701/15 |
| 8,244,412 B2* | 8/2012 | Myers et al. | 701/3 |
| 8,262,019 B2* | 9/2012 | Schmidt et al. | 244/100 R |
| 8,296,197 B2 | 10/2012 | Avery et al. | |
| 8,321,083 B2 | 11/2012 | Beebe et al. | |
| 8,335,601 B2* | 12/2012 | Sham et al. | 701/3 |
| 8,560,148 B2* | 10/2013 | Torres et al. | 701/3 |
| 8,798,848 B2* | 8/2014 | Gu et al. | 701/29.4 |
| 8,924,137 B2* | 12/2014 | Chan et al. | 701/120 |
| 2008/0005617 A1 | 1/2008 | Maggiore et al. | |
| 2009/0138516 A1 | 5/2009 | Young et al. | |
| 2009/0265357 A1* | 10/2009 | Yukawa et al. | 707/10 |
| 2010/0121938 A1* | 5/2010 | Saugnac | 709/218 |
| 2010/0152962 A1 | 6/2010 | Bennett et al. | |
| 2010/0211236 A1* | 8/2010 | Ziarno | 701/3 |
| 2012/0191273 A1* | 7/2012 | Jacobs et al. | 701/3 |
| 2013/0166505 A1* | 6/2013 | Peretz et al. | 707/611 |
| 2013/0345910 A1* | 12/2013 | Kerho et al. | 701/14 |

OTHER PUBLICATIONS

Extended European Search Report, Application No. 14158926.7, dated Jul. 3, 2014, 5 pages.

* cited by examiner

*Primary Examiner* — Miranda Le
(74) *Attorney, Agent, or Firm* — Toler Law Group, PC

(57) ABSTRACT

A method includes receiving first vehicle log data related to modification of a first software part at a first vehicle. The method also includes receiving first ground log data of a first ground system. The first ground log data indicates first chain-of-custody information regarding the first software part. The method further includes analyzing the first vehicle log data and the first ground log data based on baseline data to detect an anomaly. The method also includes sending a notification in response to detecting the anomaly.

19 Claims, 10 Drawing Sheets

ANOMALY DETECTION IN CHAIN-OF-CUSTODY INFORMATION

FIELD OF THE DISCLOSURE

The present disclosure is generally related to anomaly detection in chain-of-custody information.

BACKGROUND

Many commercial aircraft include onboard data networking and digital communication systems that can reduce operator cost, improve safety, and increase efficiency of operations for airlines. Functional organizations within an airline may work closely with each other and with aircraft manufacturers to plan and implement strategies that benefit the security and integrity of the aircraft. Regulatory authorities may require that airlines generate and regularly review aircraft logs that document changes made to each aircraft. Reviewing aircraft logs for large fleets of aircraft can be quite burdensome. Some airlines may not be equipped with information technology resources and technical sophistication to regularly undertake review of aircraft log data, e.g., to ensure that security requirements, regulatory requirements, or both, are being met. Even for airlines that have information technology resources and technical sophistication to regularly review aircraft logs, this review is burdensome and costly (e.g., in terms of hours required for skilled operators to analyze aircraft log data and ground system log data).

SUMMARY

Systems and methods to analyze aircraft log data and ground system log data to detect anomalies in chain-of-custody information are disclosed. Electronic systems of a vehicle may use software applications to provide logic or control for various operations and functions. The software applications may be treated as software parts. Examples of a software part include an onboard maintenance system application, a time manager application, a network server crossover interface, a flight-input data-output function, an onboard data load function, an electronic flight bag data manager, a terminal wireless local area network unit gate link authenticator, a wireless uplink and downlink diagnostics manager, a health manager, an onboard maintenance system, a support and maintenance system manager, and a flight-input data-output diagnostic manager. Ground systems and vehicles (e.g., aircrafts) may maintain logs associated with chain-of-custody of software parts for the vehicles. Examples of ground systems include maintenance computer systems. A ground system may record information related to modification (e.g. installation, deletion, upgrade, update, or the like) of a software part in a ground system log. For example, when the software part is received by the ground system from another device (e.g., another ground system), when the software part is forwarded by the ground system to another device (e.g., a vehicle or another ground system), when a modification request related to the software part is received by the ground system, when a modification request related to the software part is sent by the ground system, or a combination thereof. The vehicle (e.g., an aircraft) may also record information related to the software part in a vehicle log when the software part is received by the vehicle, when a modification request is received by the vehicle, when the software part is modified (e.g. installed, deleted, upgraded, updated, or the like) at a computer of the vehicle, or any combination thereof. In addition, the vehicle may record a status of the vehicle at different times in the vehicle log. The information related to the software part recorded in the ground system log, the vehicle log, or both, may indicate an identifier of a sending device, an identifier of a receiving device, a time, a date, a location, how modification of the software part was initiated, who initiated or authorized the modification, an aircraft status during the modification, other information, or a combination thereof.

For purposes of anomaly detecting, baseline data may be generated based on a normal modification (e.g., a modification without detected anomalies) of software at a particular vehicle. The baseline data may be generated (or modified after generation) based on security requirements. The baseline data may include chain-of-custody information related to a software part or parts modified at the vehicle by one or more ground systems. The baseline data may be used to compare particular vehicle log information and ground system log information to detect anomalies. Thus, review of logs can be automated in a manner that may improve efficiency and effectiveness of vehicle log review.

The disclosed embodiments may receive a ground system log and a vehicle log and analyze the ground system log and the vehicle log based on the baseline data to detect anomalies in the chain-of-custody information. For example, an anomaly may indicate that a duration between a ground system sending a software part (or a modification request) to a vehicle and the vehicle receiving the software part (or the modification request) exceeds a threshold duration indicated by the baseline data. As another example, the anomaly may indicate that a status of the vehicle at the time of receiving the software part (or the modification request) does not match an expected status indicated by the baseline data. As another example, the anomaly may indicate that a modification status of modifying a software part at the vehicle does not match an expected modification status indicated by the baseline data. Thus, the analysis may automate the aircraft log review process of airlines and may enable detection of anomaly in chain-of-custody information (e.g., based on the security requirements).

In a particular embodiment, a method includes receiving vehicle log data related to modification of a software part at a vehicle. The method also includes receiving ground log data of a ground system. The ground log data indicates chain-of-custody information regarding the software part. The method further includes analyzing the vehicle log data and the ground log data based on baseline data to detect an anomaly. The method also includes sending a notification in response to detecting the anomaly.

In another particular embodiment, a system includes a processor and a memory. The memory stores instructions that, when executed by the processor, cause the processor to perform operations including receiving vehicle log data related to modification of a software part at a vehicle. The operations also include receiving ground log data of a ground system. The ground log data indicates chain-of-custody information regarding the software part. The operations further include analyzing the vehicle log data and the ground log data based on baseline data to detect an anomaly. The operations further include sending a notification in response to detecting the anomaly.

In another particular embodiment, a computer-readable storage device stores instructions that, when executed by a processor, cause the processor to perform operations including receiving vehicle log data related to modification of a software part at a vehicle. The operations also include receiving ground log data of a ground system. The ground log data indicates chain-of-custody information regarding the software part. The operations further include analyzing the vehicle log data and the ground log data based on baseline data to detect an anomaly. The operations also include sending a notification in response to detecting the anomaly.

Thus, particular embodiments analyze vehicle log data and ground log data based on baseline data to detect an anomaly. For example, the anomaly may indicate that a software part (or a modification request) received by the vehicle was not sent by the ground system within a threshold time duration indicated by the baseline data. Review of the vehicle log data and ground log data may be automated to detect anomalies in chain-of-custody information associated with a software part. Automated review of logs may improve efficiency and may reduce cost associated with log review.

The features, functions, and advantages that have been described can be achieved independently in various embodiments or may be combined in yet other embodiments, further details of which are disclosed with reference to the following description and drawings.

DETAILED DESCRIPTION

Figure 1:
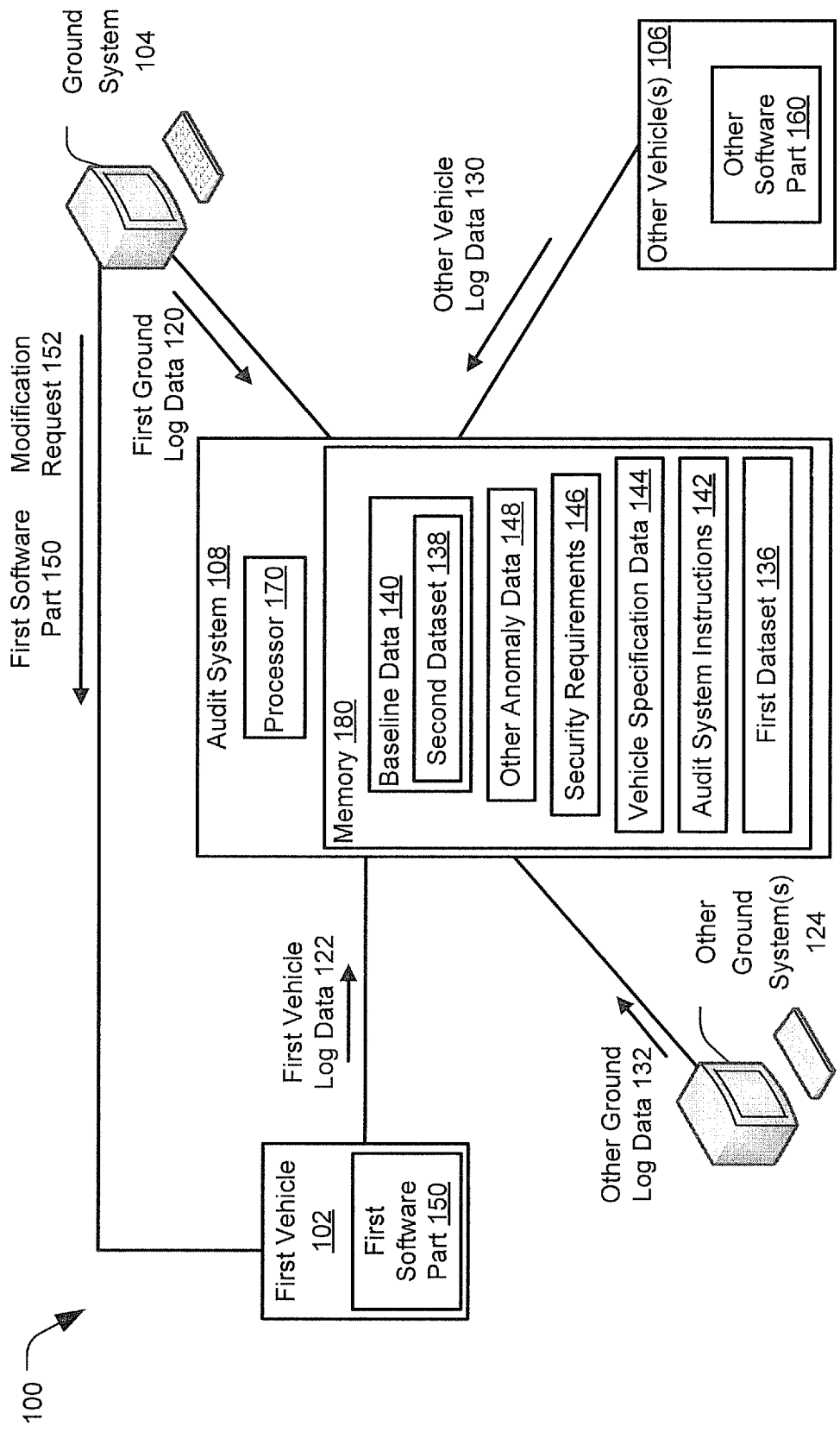
FIG. 1 is a diagram of a particular embodiment of a system to detect an anomaly in chain-of-custody information.

Referring to FIG. 1, a diagram of a particular embodiment of a system to detect an anomaly in chain-of-custody information is disclosed and generally designated 100. The system 100 may include an audit system 108 coupled to or in communication with a ground system 104 and to a first vehicle 102 (e.g., an aircraft). The audit system 108 may also be coupled to or in communication with one or more other vehicles 106 and to one or more other ground systems 124. The audit system 108 may include a processor 170 and a memory 180. The audit system 108 may include more than one processor and may include more than one memory. For example, the audit system 108 may include a networked or distributed computing system. In a particular illustrative embodiment, the audit system 108 may include a communications device, a personal digital assistant (PDA), a mobile location data unit, a mobile phone, a cellular phone, a portable computer, a tablet computing device, or a combination thereof. Such devices may include a user interface, e.g., a touch screen, voice recognition capability, or other user interface capabilities.

The memory 180 may store instructions (e.g., audit system instructions 142) that are executable by the processor 170 to perform various operations. For example, the processor 170 may perform operations including receiving ground log data (e.g., first ground log data 120 or other ground log data 132) of a ground system (e.g., the ground system 104 or the other ground systems 124). The processor 170 may also receive vehicle log data (e.g., first vehicle log data 122 or other vehicle log data 130) from a vehicle (e.g., the first vehicle 102 or the other vehicles 106).

In a particular embodiment, the ground system 104 may receive a first software part 150, e.g., from the other ground systems 124. The ground system 104 may record chain-of-custody information regarding the first software part 150 in the first ground log data 120. The chain-of-custody information may include a timestamp associated with an event, an identifier associated with the event, a status of the event (e.g., succeeded or failed), other information, or a combination thereof. Examples of an event include the ground system 104 receiving the first software part 150 from another device (e.g., the other ground systems 124), receiving a modification request 152 to modify the first software part 150 from another device (e.g., the other ground systems 124), forwarding the first software part 150 to a second device (e.g., the first vehicle 102, the other vehicles 106, or the other ground systems 124), sending the modification request 152 to the second device, or a combination thereof. Examples of an identifier associated with an event include a software part identifier, a hardware part identifier (e.g., an identifier of a hardware part that is associated with the software part), an event identifier, a device identifier (e.g., an identifier of a device that the software part is received from, an identifier of a device that the software part is sent to, an identifier of a device at which the software part is modified, a maintenance computer identifier, a vehicle identifier, a ground system identifier, an identifier of a device that authorized or initiated the transfer (or modification) of the software part), a location identifier, and a user identifier (e.g., an identifier of a user who initiated or authorized the transfer (or modification) of the software part).

For example, in response to receiving the first software part 150 from the other ground systems 124, the ground system 104 may record a timestamp in the first ground system log data 120 indicating when the first software part 150 was received by the ground system 104 from the other ground systems 124. The ground system 104 may also record an identifier associated with the first software part 150. For example, the ground system 104 may record a software part identifier indicating the first software part 150, a hardware part identifier indicating a hardware part that is associated with the first software part 150, a ground system identifier of the other ground systems 124, an identifier of a user who initiated or authorized the transfer of the first software part 150 from the other ground systems 124, an identifier of a device that initiated or authorized the transfer of the first software part 150 from the other ground systems 124, an identifier of a location of the other ground systems 124, an identifier of a location of the ground system 104, an identifier of a device that the first software part 150 is to be forwarded to, other information, or a combination thereof.

The ground system 104 may send the first software part 150 to the first vehicle 102, the other ground systems 124, or both. The ground system 104 may periodically send software parts to devices (e.g., the first vehicle 102, the other ground systems 124, or both), may send a software part to a device in response to an event (e.g., a user request, a request from the device, or receiving the software part), or a combination thereof. The ground system 104 may record a timestamp in the first ground log data 120 indicating when the first software part 150 was sent by the ground system 104 to another device (e.g., to the first vehicle 102). The ground system 104 may also record an identifier associated with the first software part 150. For example, the ground system 104 may record an event identifier that identifies an event of sending the first software part 150 by the ground system 104 and a vehicle identifier of the first vehicle 102. The ground system 104 may send the event identifier with the first software part 150 to the first vehicle 102. The ground system 104 may also record a software part identifier indicating the first software part 150, a hardware part identifier indicating a hardware part of the first vehicle 102 that is associated with the first software part 150, an identifier of a user who initiated or authorized the transfer of the first software part 150 to the first vehicle 102, an identifier of a device that initiated or authorized the transfer of the first software part 150 to the first vehicle 102, an identifier of a location of the first vehicle 102, an identifier of a location of the ground system 104, an identifier of a device that the first software part 150 was received from (e.g., the other ground systems 124), other information, or a combination thereof.

The first vehicle 102 may receive the first software part 150 from the ground system 104. The first vehicle 102 may record information related to receiving the first software part 150 at the first vehicle 102 in the first vehicle log data 122. The first vehicle log data 122 may include a timestamp associated with an event, an identifier associated with the event, a status of the first vehicle 102 when the first software part 150 was received, a status of the event, other information, or a combination thereof. Examples of the event may include the first vehicle 102 receiving the first software part 150 from the ground system 104, the other ground systems 124, or both. The identifier associated with the event may include an event identifier, a device identifier (e.g., an identifier of a device that the software part is received from, a maintenance computer identifier, a vehicle identifier, a ground system identifier, an identifier of a device that authorized or initiated the transfer of the software part), a software part identifier, a hardware part identifier (e.g., an identifier of a hardware part that is associated with the software part), a user identifier (e.g., an identifier of a user who initiated or authorized the transfer of the software part), a location identifier, or a combination thereof.

The ground system 104 may send a modification request 152 related to the first software part 150 to the first vehicle 102, the other ground systems 124, or both. The ground system 104 may periodically send modification requests to modify software parts to devices (e.g., the first vehicle 102, the other ground systems 124, or both), may send a modification request to modify a software part at a device in response to an event (e.g., a user request, a request from the device, receiving the software part, receiving a modification request to modify the software part), or a combination thereof. The ground system 104 may record a timestamp in the first ground log data 120 indicating when the ground system 104 sent the modification request 152 to another device (e.g., the first vehicle 102). The ground system 104 may also record an identifier associated with the modification request 152. For example, the ground system 104 may record an event identifier that identifies an event of sending the modification request 152 by the ground system 104 and a vehicle identifier of the first vehicle 102. The ground system 104 may send the event identifier with the modification request 152 to the first vehicle 102. The modification request 152 may indicate that the first software part 150 is to be installed, deleted, upgraded, updated, or the like. The ground system 104 may also record a software part identifier indicating the first software part 150, a hardware part identifier indicating a hardware part of the first vehicle 102 that is associated with the first software part 150, an identifier of a user who initiated or authorized the modification of the first software part 150 at the first vehicle 102, an identifier of a device that initiated or authorized the modification of the first software part 150 at the first vehicle 102, an identifier of a location of the first vehicle 102, an identifier of a location of the ground system 104, other information, or a combination thereof.

The first vehicle 102 may receive the modification request 152 from the ground system 104. For example, the first software part 150 may be modified (e.g., installed, deleted, upgraded, updated, or the like) at a computing device of the first vehicle 102. The first vehicle 102 may record information related to the modification of the first software part 150 at the first vehicle 102 in the first vehicle log data 122. The first vehicle log data 122 may include a timestamp associated with an event, an identifier associated with the event, a status of the first vehicle 102 when the first software part 150 was received, a status of the event, other information, or a combination thereof. Examples of the event may include the first vehicle 102 receiving the modification request 152 from the ground system 104, the other ground systems 124, or both. The identifier associated with the event may include an event identifier, a device identifier (e.g., an identifier of a device that the modification request is received from, a maintenance computer identifier, a vehicle identifier, a ground system identifier), a software part identifier, a hardware part identifier (e.g., an identifier of a hardware part that is associated with the software part), a user identifier (e.g., an identifier of a user who initiated or authorized the modification of the software part), a location identifier, or a combination thereof. In a particular embodiment, the ground system 104 may send the modification request 152 with the first software part 150. In a particular embodiment, sending the first software part 150 may implicitly include sending the modification request 152. For example, sending the first software part 150 may indicate that installation of the first software part 150 is requested.

For example, in response to receipt of the first software part 150 (or the modification request 152), the first vehicle 102 may record a timestamp indicating when the first software part 150 (or the modification request 152) is received by the first vehicle 102. As another example, in response to modification (e.g., installation, deletion, upgrade, update, or the like) of the first software part 150, the first vehicle 102 may record a timestamp indicating when the first software part 150 is modified at the first vehicle 102. The first vehicle 102 may record the event identifier received by the first vehicle 102 with the first software part 150 (or the modification request 152) and a ground system identifier indicating the ground system 104. The first vehicle 102 may also record a software part identifier indicating the first software part 150, a hardware part identifier indicating a hardware part of the first vehicle 102 that is associated with the first software part 150, an identifier of a user who initiated or authorized the transfer of the first software part 150 to the first vehicle 102, an identifier of a user who initiated or authorized modification (e.g., installation, deletion, upgrade, update, or the like) of the first software part 150 at the first vehicle 102, an identifier of a device that initiated or authorized the transfer of the first software part 150 to the first vehicle 102, an identifier of a device that initiated or authorized the modification of the first software part 150 at the first vehicle 102, an identifier of a location of the first vehicle 102, an identifier of a device that the first software part 150 was received from (e.g., the ground system 104), an identifier of a location of the ground system 104, a status of the first vehicle 102 when the first software part 150 (or the modification request 152) was received, a status of the first vehicle 102 when the first software part 150 was modified, a status of the modification of the first software part 150 (e.g., whether the modification was successful or failed), other information, or a combination thereof.

The audit system 108 may receive the first vehicle log data 122 from the first vehicle 102 and may receive the first ground log data 120 from the ground system 104. In a particular embodiment, the audit system 108 may periodically receive the first vehicle log data 122 and the first ground log data 120. In a particular embodiment, the audit system 108 may receive the first vehicle log data 122 and the first ground log data 120 in response to an event, such as a user request to begin an audit.

The audit system 108 may analyze the first vehicle log data 122 and the first ground log data 120 to detect an anomaly. For example, the audit system 108 may analyze the first vehicle log data 122 and the first ground log data 120 based on baseline data 140. In a particular embodiment, the ground system 104 and the first vehicle 102 may have different clocks. In this embodiment, the audit system 108 may synchronize the first vehicle log data 122 and the first ground log data 120 to account for the different clocks of the first vehicle 102 and the ground system 104. The audit system 108 may identify a common event in the first vehicle log data 122 and the first ground log data 120 (e.g., based on a common event identifier). For example, the common event may include the ground system 104 sending a second software part to the first vehicle 102, and the first vehicle 102 receiving the second software part. The audit system 108 may determine that the first ground log data 120 includes a first timestamp associated with the common event, and the first vehicle log data 122 includes a second timestamp associated with the common event. For example, the first timestamp may indicate when (based on a clock of the ground system 104) the ground system 104 sent the second software part to the first vehicle 102, and the second timestamp may indicate when (based on a clock of the first vehicle 102) the first vehicle 102 received the second software part from the ground system 104.

The audit system 108 may generate synchronized event data in which the first vehicle log data 122 is aligned in time (e.g., synchronized) with the first ground log data 120 based on the first timestamp and the second timestamp. For example, the audit system 108 may determine a difference between the first timestamp and the second timestamp and may modify timestamps of the first vehicle log data 122, the first ground log data 120, or both, based on the difference to synchronize the first vehicle log data 122 and the first ground log data 120. To illustrate, if the difference between the first timestamp and the second timestamp indicates that the clock of the ground system 104 is an hour ahead of the clock of the first vehicle 102, the audit system 108 may add an hour to the timestamps indicated in the first vehicle log data 122 to synchronize the first vehicle log data 122 and the first ground log data 120. In another particular embodiment, the first vehicle log data 122 and the first ground log data 120 may be synchronized without modifying the timestamps (e.g., when the clocks of the ground system 104 and the first vehicle 102 are substantially synchronized).

The audit system 108 may perform a comparison of the synchronized first vehicle log data 122 and the synchronized first ground log data 120. For example, the audit system 108 may identify a first event of the synchronized first vehicle log data 122 and may identify a corresponding second event of the synchronized first ground log data 120. To illustrate, the audit system 108 may parse the synchronized first vehicle log data 122 and may identify the first event indicating that the first vehicle 102 received the first software part 150 (or the modification request 152) from the ground system 104. The audit system 108 may also parse the synchronized first ground log data 120 and may identify the second event indicating that the ground system 104 sent the first software part 150 (or the modification request 152). The audit system 108 may determine that the second event corresponds to the first event based on an identifier. For example, the first event and the second event may be associated with a common identifier (e.g., an event identifier, a software part identifier, a hardware part identifier, a user identifier, a device identifier, a location identifier, another identifier, or a combination thereof) included within each of the synchronized first ground log data 120 and the synchronized first vehicle log data 122.

The audit system 108 may generate a first dataset 136 based on the comparison of the synchronized first vehicle log data 122 and the synchronized first ground log data 120. For example, the audit system 108 may generate the first dataset 136 to include a first time duration indicating a difference between a first event timestamp associated with the first event and a second event timestamp associated with the second event. To illustrate, the first time duration may indicate a time difference between when the ground system 104 sent the first software part 150 (or the modification request 152) to the first vehicle 102 and when the first vehicle 102 received the first software part 150 (or the modification request 152) from the ground system 104. As another example, the first time duration may indicate a time difference between when the ground system 104 sent the modification request 152 to the first vehicle 102 and when the first vehicle 102 modified the first software part 150.

In a particular embodiment, the audit system 108 may modify the first dataset 136 based on second ground log data (e.g., the other ground log data 132) associated with a second ground system (e.g., the other ground systems 124). For example, the audit system 108 may receive and synchronize the other ground log data 132. The audit system 108 may modify the first dataset 136 based on an analysis of the synchronized other ground log data 132, the synchronized first ground log data 120, and the synchronized first vehicle log data 122. For example, the audit system 108 may modify the first dataset 136 to include a time duration indicating a time difference between when the second ground system (e.g., the other ground systems 124) sent the first software part 150 (or the modification request 152) to another device (e.g., the first vehicle 102 or the ground system 104) and when the other device (e.g., the first vehicle 102 or the ground system 104) received the first software part 150 (or the modification request 152) from the second ground system (e.g., the other ground systems 124). As another example, the audit system 108 may modify the first dataset 136 to include a time duration indicating a time difference between when the second ground system (e.g., the other ground systems 124) sent the modification request 152 to another device (e.g., the first vehicle 102 or the ground system 104) and when the first software part 150 was modified at the other device (e.g., the first vehicle 102 or the ground system 104).

In a particular embodiment, the audit system 108 may determine (e.g., based on the first vehicle log data 122, the first ground log data 120, other data, or a combination thereof) a status of the first vehicle 102 at a time of the first event in the first dataset 136. Examples of the status of the first vehicle 102, when the first vehicle 102 is an aircraft, include a weight-on-wheels status, a tilt status, a ground speed status, an air speed status, a parking brake status, and an airport distance status indicative of a distance between the first vehicle and an airport. For example, the audit system 108 may determine that a state value (e.g., 0) of the first vehicle log data 122 indicates a particular weight-on-wheels status (e.g., false) of the first vehicle 102 when the first vehicle 102 received the first software part 150 (or the modification request 152). The particular weight-on-wheels status (e.g., false) may indicate that the first vehicle 102 received the first software part 150 (or the modification request 152) while airborne. Another state value (e.g., 1) of the first vehicle log data 122 may indicate another particular weight-on-wheels status (e.g., true) of the first vehicle 102 at another time. For example, the other particular weight-on-wheels status (e.g., true) may indicate that the first vehicle 102 was on the ground when the first software part 150 (or the modification request 152) was received. The audit system 108 may include data indicating the status of the first vehicle 102 at the time of the first event in the first dataset 136. For example, the audit system 108 may modify the first dataset 136 to indicate the particular weight-on-wheels status of the first vehicle 102 when the first vehicle 102 received the first software part 150, when the first vehicle 102 received the modification request 152, or when the first software part 150 was modified at the first vehicle 102. As another example, the audit system 108 may modify the first dataset 136 to indicate a status of the first vehicle 102 when the first software part 150 was modified at the first vehicle 102. As another example, the audit system 108 may modify the first dataset 136 to indicate a status of the modification of the first software part 150 at the first vehicle 102. To illustrate, the status of the modification may indicate whether the first software part 150 was modified successfully or whether the modification failed. The status of the modification may indicate whether any errors (or warnings) were detected during modification and information regarding the errors (or warnings).

The audit system 108 may compare the first dataset 136 to a corresponding second dataset 138 of the baseline data 140 to determine whether an anomaly is present in the first dataset 136. In a particular embodiment, the second dataset 138 of the baseline data 140 may include log data and other data (such as thresholds or expected ranges) corresponding to a modification of a software part without any detected anomalies. For example, the second dataset 138 may indicate a threshold duration between a ground system sending a software part (or a modification request) to another device (e.g., a vehicle or another ground system) and the other device (e.g., the vehicle or the other ground system) receiving the software part (or the modification request). To illustrate, the second dataset 138 may include a maximum threshold duration, a minimum threshold duration, or both, between a ground system sending a software part (or a modification request) to another device (e.g., a vehicle or another ground system) and the other device (e.g., the vehicle or the other ground system) receiving the software part (or the modification request). As another example, the second dataset 138 may indicate a threshold duration between a ground system sending a modification request to another device (e.g., a vehicle or another ground system) and the software part being modified at the other device (e.g., the vehicle or the other ground system). To illustrate, the second dataset 138 may include a maximum threshold duration, a minimum threshold duration, or both, between a ground system sending a modification request to another device (e.g., a vehicle or another ground system) and the software part being modified at the other device (e.g., the vehicle or the other ground system). As another example, the second dataset 138 may indicate an expected status of the vehicle when the vehicle receives the software part, when the vehicle receives the modification request, when the software part is modified at the vehicle, or a combination thereof. As another example, the second dataset 138 may indicate an expected transfer order, e.g., from a first ground system to a second ground system, and then to a vehicle. As another example, the second dataset 138 may indicate a particular user (or device), a user (or device) with a particular authorization level, a user (or device) at a particular location, or a combination thereof, may authorize or initiate transfer (or modification) of the software part.

An anomaly in the first dataset 136 may be detected when the comparison of the first dataset 136 to the second dataset 138 indicates that the first dataset 136 has at least one unexpected value. For example, the audit system 108 may detect an anomaly in response to determining that a first time duration between when the ground system 104 sent the first software part 150 (or the modification request 152) to another device (e.g., the first vehicle 102 or another ground system) and when the other device (e.g., the first vehicle 102 or another ground system) received the first software part 150 (or the modification request 152) exceeds the maximum threshold duration indicated by the second dataset 138 or that the first time duration is below the minimum threshold duration indicated by the second dataset 138. As another example, the audit system 108 may detect an anomaly in response to determining that a second time duration between when the ground system 104 received the first software part 150 (or the modification request 152) from another device (e.g., another ground system) and when the other device (e.g., the other ground system) sent the first software part 150 (or the modification request 152) exceeds the maximum threshold duration indicated by the second dataset 138 or that the second time duration is below the minimum threshold duration indicated by the second dataset 138.

As another example, the audit system 108 may detect an anomaly in response to determining that a first time duration between when the ground system 104 sent the modification request 152 to another device (e.g., the first vehicle 102 or another ground system) and when the first software part 150 was modified at the other device (e.g., the first vehicle 102 or another ground system) exceeds the maximum threshold duration indicated by the second dataset 138 or that the first time duration is below the minimum threshold duration indicated by the second dataset 138.

As another example, the audit system 108 may detect an anomaly in response to determining that the status of first vehicle 102 indicates a particular weight-on-wheels status (e.g., false) that does not correspond to an expected weight-on-wheels status (e.g., true) indicated by the second dataset 138. As another example, the audit system 108 may detect an anomaly in response to determining that the status (e.g., failed) of the modification of the first software part 150 does not correspond to an expected modification status (e.g., succeeded) indicated by the second dataset 138.

As another example, the audit system 108 may detect an anomaly in response to determining that a transfer order of the first software part 150 (or the modification request 152) does not correspond to an expected transfer order indicated by the second dataset 138. To illustrate, the audit system 108 may detect an anomaly in response to determining that the ground system 104 sent the first software part 150 (or the modification request 152) to another device (e.g., the vehicle 102 or another ground system) that does not correspond to a second device indicated by the expected transfer order of the second dataset 138, that the ground system 104 received the first software part 150 (or the modification request 152) from another device (e.g., another ground system) that does not correspond to a second device indicated by the expected transfer order of the second dataset 138, or that the first vehicle 102 received the first software part 150 (or the modification request 152) from another device (e.g., the ground system 104 or another ground system) that does not correspond to a second device indicated by the expected transfer order of the second dataset 138.

As another example, the audit system 108 may detect an anomaly in response to determining that there is a gap in the chain-of-custody. To illustrate, the audit system 108 may determine that the first dataset 136 indicates another device (e.g., another ground system) sending the first software part 150 (or the modification request 152) to the ground system 104 and does not indicate the ground system 104 receiving the first software part 150 (or the modification request 152) from the other device, indicates the ground system 104 receiving the first software part 150 (or the modification request 152) from another device (e.g., another ground system) but does not indicate the other device sending the first software part 150 (or the modification request 152) to the ground system 104, indicates the ground system 104 sending the first software part 150 (or the modification request 152) to another device (e.g., the vehicle 102 or another ground system) and does not indicate the other device receiving the first software part 150 (or the modification request 152) from the ground system 104, or indicates another device (e.g., the vehicle 102 or another ground system) receiving the first software part 150 (or the modification request 152) from the ground system 104 and does not indicate the ground system 104 sending the first software part 150 (or the modification request 152) to the other device.

As another example, the audit system 108 may detect an anomaly in response to determining that a transfer (or modification) of the first software part 150 was authorized or initiated by a user (or a device) that does not correspond to an expected user (or a device) indicated by the second dataset 138. The audit system 108 may send a notification in response to detecting the anomaly. For example, the audit system 108 may send a message regarding the anomaly (e.g., to a user, to another device, or both), display an alert regarding the anomaly (e.g., at an output device), or both.

In a particular illustrative embodiment, the audit system 108 may generate or modify the first dataset 136 based on other anomaly data 148 indicating that a particular anomaly was detected in another vehicle (e.g., the other vehicles 106). To illustrate, the audit system 108 may determine that the other anomaly data 148 indicates that the particular anomaly was detected in chain-of-custody information of the other vehicles 106. In response to the other anomaly data 148, the audit system 108 may generate or modify the first dataset 136 to enable or facilitate detection of the particular anomaly in chain-of-custody information of the first vehicle 102. For example, the audit system 108 may modify the first dataset 136 to include data related to only those events that are associated with the particular anomaly detected in the other vehicles 106. To illustrate, the anomaly may be related to modification of a particular software part (e.g., the first software part 150) at the other vehicles 106. The audit system 108 may modify the first dataset 136 to include data related only to events associated with modification of the first software part 150 at the first vehicle 102.

As another example, the other anomaly data 148 may indicate that the particular anomaly was detected in response to determining that a software part (or a modification request) was received by the other vehicles 106 when the other vehicles 106 had a particular status. Based on the other anomaly data 148, the audit system 108 may generate or modify the first dataset 136 to include a status of the first vehicle 102 when the first vehicle 102 received the first software part 150 (or the modification request 152). As another example, the other anomaly data 148 may indicate that the particular anomaly was detected in response to determining that a software part was modified by the other vehicles 106 when the other vehicles 106 had a particular status. Based on the other anomaly data 148, the audit system 108 may generate or modify the first dataset 136 to include a status of the first vehicle 102 when the first software part 150 was modified at the first vehicle 102. As another example, the other anomaly data 148 may indicate that the particular anomaly was detected in response to determining that modification of a software part at the other vehicles 106 resulted in a particular modification status. Based on the other anomaly data 148, the audit system 108 may generate or modify the first dataset 136 to include a modification status resulting from modification of the first software part 150 at the first vehicle 102.

In a particular illustrative embodiment, the audit system 108 may aggregate audit data. For example, the audit system 108 may aggregate audit data related to a particular vehicle (e.g., the first vehicle 102 or the other vehicles 106), a particular ground system (e.g., the ground system 104 or the other ground systems 124), a particular software part (e.g., the first software part 150), a particular type of vehicle (e.g., based on a model, a year of manufacture, a manufacturer, a number of engines, etc.), a particular time range, a particular location (e.g., an airport), or a combination thereof. To illustrate, the audit system 108 may aggregate audit data related to vehicles included in a fleet of a particular airline. The aggregated audit data may include data regarding the anomaly. The audit system 108 may send a message regarding the aggregated audit data (e.g., to a user, to another device, or both), may display the aggregated audit data (e.g., at an output device), or both.

In a particular illustrative embodiment, the audit system 108 may generate the baseline data 140. The baseline data 140 may include the second dataset 138 representative of a modification of a software part (e.g., the other software part 160) at a vehicle (e.g., the other vehicles 106) without any detected anomalies. The audit system 108 may generate the second dataset 138 of the baseline data 140 based on the other vehicle log data 130 and the other ground log data 132, as further described with reference to FIG. 2. The audit system 108 may modify the baseline data 140 based on security requirements 146, vehicle specification data 144, or both, as further described with reference to FIG. 2. The second dataset 138 may indicate that the modification of the other software part 160 at the other vehicles 106 is without a detected anomaly. In a particular embodiment, the second dataset 138 may be representative of a modification of a second software part at the first vehicle 102. In a particular embodiment, the second dataset 138 may include aggregated data. For example, the second dataset 138 may include an expected range of time, an expected vehicle status, or both, based on modifications at other aircraft of the same type as the first vehicle 102.

Thus, the audit system 108 may enable anomaly detection in vehicle log data and ground system log data that includes chain-of-custody information. The audit system 108 may receive the first vehicle log data 122 from the first vehicle 102 and may receive the first ground log data 120 from the ground system 104. The audit system 108 may analyze the first vehicle log data 122 and the first ground log data 120 based on the baseline data 140 to detect an anomaly. Hence, the audit system 108 may automate review of the first ground log data 120 and the first vehicle log data 122 to detect an anomaly in chain-of-custody information associated with the first software part 150. Automated review of logs may reduce time, cost, or both, associated with log review.

Figure 2:
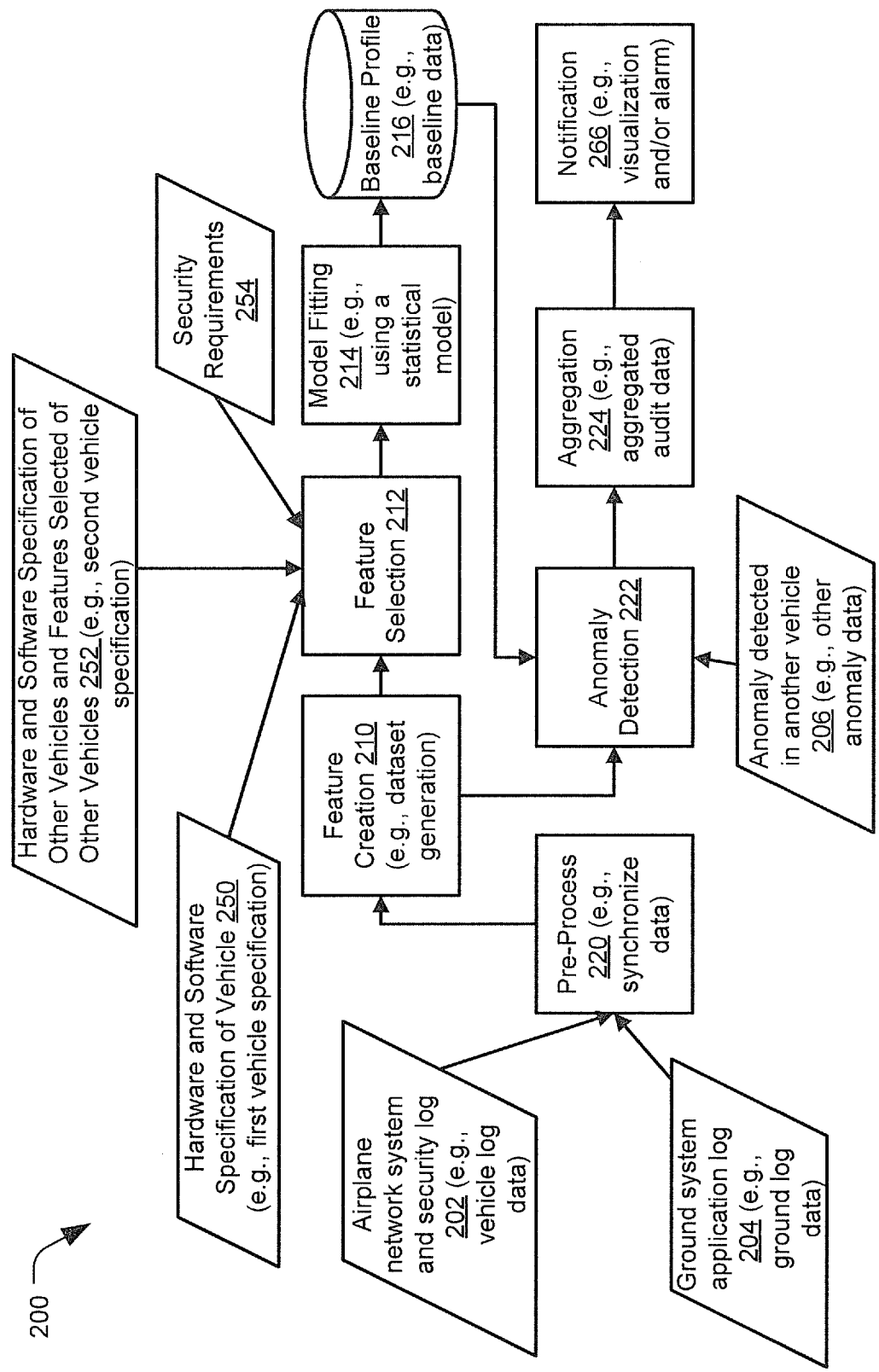
FIG. 2 is a diagram of another particular embodiment of a system to detect an anomaly in chain-of-custody information.

Referring to FIG. 2, a diagram of a particular embodiment of a system to detect an anomaly in chain-of-custody information is disclosed and generally designated 200. The system 200 is illustrated and described in terms of functional modules. In various embodiments, one or more of the functional modules may be implemented as instructions stored on a computer-readable medium (e.g., a hard disk drive, a memory). The instructions may be executable by one or more processors. In a particular embodiment, the functions of the one or more functional modules may be implemented as circuitry. The circuitry may include a field-programmable gate array (FPGA) device, an application-specific integrated circuit (ASIC), a processing unit such as a central processing unit (CPA), a controller, a firmware device, or another hardware device.

The functional modules of the system 100 may include a pre-process module 220, an anomaly detection module 222, an aggregation module 224, a notification module 266, a feature creation module 210, a feature selection module 212, a model fitting module 214, or a combination thereof. The modules may communicate with each other to process log data to detect an anomaly. In a particular embodiment, the audit system 108 of FIG. 1 may include one or more of the modules. The system 200 may include baseline profile data 216. In a particular embodiment, the baseline profile data 216 may correspond to the baseline data 140 of FIG. 1.

The pre-process module 220 may receive an airplane network system and security log 202. The airplane network system and security log 202 may be a specific example of the first vehicle log data 122 of FIG. 1. The pre-process module 220 may also receive a ground system application log 204. The ground system application log 204 may be a specific example of the first ground log data 120 of FIG. 1. The pre-process module 220 may synchronize the airplane network system and security log 202 and the ground system application log 204 to synchronize the first vehicle log data 122 and the first ground log data 120, as described with reference to FIG. 1. In a particular embodiment, the pre-process module 220 may send the synchronized first vehicle log data 122 and the synchronized first ground log data 120 to the feature creation module 210. The feature creation module 210 may generate the first dataset 136 based on comparing the first vehicle log data 122 and the first ground log data 120. The feature creation module 210 may send the first dataset 136 to the anomaly detection module 222. In addition, the anomaly detection module 222 may receive the baseline profile data 216 (e.g., the baseline data 140 of FIG. 1). The anomaly detection module 222 may detect an anomaly based on a comparison of the first dataset 136 and a second dataset 138 of the baseline data 140. The aggregation module 224 may aggregate audit data based on information received by the aggregation module 224 from the anomaly detection module 222 regarding the anomaly. In response to receiving the aggregated audit data from the aggregation module 224, the notification module 266 may send a message regarding the anomaly (e.g., to a user, to another device, or both), display a notification regarding the anomaly (e.g., at an output device), or both.

In a particular illustrative embodiment, the anomaly detection module 222 may generate or modify the first dataset 136 based on an anomaly 206 detected in another vehicle. For example, the anomaly 206 may correspond to an anomaly detected in the other anomaly data 148 of FIG. 1. The anomaly detection module 222 may modify the first dataset 136 to include data related only to those events that are associated with the anomaly 206. Including only events that are related to a known anomaly (e.g., the anomaly 206) in the first dataset 136 may increase the efficiency, reduce the cost, or both, of determining whether the first dataset 136 includes the known anomaly (e.g., the anomaly 206). Determining whether the first dataset 136 includes particular anomalies may be time-sensitive and an exhaustive log review may not be called for. For example, when the first vehicle 102 is an aircraft and the airworthiness of the aircraft depends on whether the first dataset 136 indicates a known anomaly (e.g., the anomaly 206) detected in another aircraft of the same type as the aircraft, a log review based on only events associated with the known anomaly (e.g., the anomaly 206) may save valuable resources. To illustrate, the aircraft may be declared airworthy in a timely manner when the known anomaly is not detected or preventive measures may be taken in a timely manner when the known anomaly is detected.

In a particular illustrative embodiment, the system 200 may generate the baseline data 140. The baseline data 140 may include the second dataset 138 representative of a modification of a software part (e.g., the other software part 160) at a second vehicle (e.g., the other vehicles 106) without any detected anomalies. For example, the pre-process module 220 may receive second vehicle log data (e.g., the other vehicle log data 130) and may receive second ground log data (e.g., the other ground log data 132). The pre-process module 220 may synchronize the second vehicle log data and the second ground log data. The feature creation module 210 may generate the baseline data 140 based on a comparison of the synchronized second vehicle log data and the synchronized second ground log data. For example, the feature creation module 210 may generate the second dataset 138 of the baseline data 140 based on the comparison of the other vehicle log data 130 and the other ground log data 132. Feature creation may refer to (or include) a machine learning process (e.g., the baseline data 140 may be modified based on an evaluation metric). For example, the feature creation module 210 may modify the baseline data 140 based on anomalies detected in test log data having a particular set of anomalies. To illustrate, the baseline data 140 may be modified such that a particular percentage of the particular set of anomalies are detected, a particular type of anomalies are detected, or a combination thereof. As another example, the feature creation module 210 may modify the baseline data 140 over time based on results of detecting anomalies. The results may include a number of anomalies associated with each event, an anomaly score, an event score, or a combination thereof. The anomaly score (or the event score) may indicate a relevance of the detected anomaly (or event). The event score of an event may be based on anomaly scores of anomalies that are associated with the event and may be based on the number of anomalies associated with the event. For example, the event score may be a sum of the anomaly scores of the anomalies associated with the event. In a particular embodiment, the anomaly score may be based on user input (e.g., a user may assign a particular relevance score to a detected anomaly). In a particular embodiment, the anomaly score may be based on actions taken in response to detecting the anomaly. For example, when the detected anomaly is ignored (e.g., as indicated by a user selecting an ignore option) a low anomaly score may be assigned to the detected anomaly. On the other hand, when a notification is generated in response to the detected anomaly a high anomaly score may be assigned to the detected anomaly. An anomaly score may be a weighted sum of anomaly scores associated with the detected anomaly. For example, a more recent anomaly score may be assigned a higher weight than an older anomaly score. A low event score may indicate that the event has a low probability of indicating an anomaly (e.g., a low number of detected anomalies have been associated with the event, anomalies associated with the event have not been detected recently, or both), may indicate that the event has a low relevance (e.g., a large number of anomalies associated with the event have been ignored), or both. The feature creation module 210 may modify the baseline data 140 to exclude certain events based on the event scores. For example, the feature creation module 210 may remove events with a low event score from the baseline data 140. Thus, the baseline data 140 may be modified over time to include events that result in a high number of detected anomalies, to include events that are associated with detected anomalies that have a high relevance, to exclude (or remove) events that are associated with detected anomalies that have a low relevance, to exclude (or remove) events that result in a low number of detected anomalies, or a combination thereof. The automated log review may become more efficient over time, resulting in time and cost savings.

The feature selection module 212 may modify the baseline data 140. For example, the feature selection module 212 may modify the second dataset 138 based on security requirements 254 (e.g., the security requirements 146 of FIG. 1). To illustrate, the security requirements 254 may indicate a threshold duration between a ground system sending a software part (or a modification request) to a vehicle and the vehicle receiving the software part (or the modification request) from the ground system. The feature selection module 212 may modify the second dataset 138 to include the threshold duration indicated by the security requirements 254. As another example, the security requirements 254 may indicate a second threshold duration between a ground system sending a modification request to a vehicle and the software part being modified at the vehicle. The feature selection module 212 may modify the second dataset 138 to include the second threshold duration indicated by the security requirements 254. As another example, the security requirements 254 may indicate a particular expected status of the vehicle when the vehicle receives the software part, when the vehicle receives the modification request, when the software part is modified at the vehicle, or a combination thereof. For example, the security requirements 254 may indicate that the weight-on-wheels status of the vehicle should have a particular expected value when the software part is received by the vehicle. The feature selection module 212 may modify the second dataset 138 to include the particular expected status of the vehicle.

As another example, the feature selection module 212 may modify the second dataset 138 based on a hardware and software specification of the vehicle 250, and hardware and software specifications of other vehicles and features selected of other vehicles 252, or a combination thereof. In a particular embodiment, the hardware and software specification of the vehicle 250 corresponds to or includes a first vehicle specification of the vehicle specification data 144 of FIG. 1, and the hardware and software specification of other vehicles and features selected of other vehicles 252 corresponds to or includes a second vehicle specification of the vehicle specification data 144. The first vehicle specification may indicate software modules, hardware modules, or both, associated with the first vehicle 102, and the second vehicle specification may indicate software modules, hardware modules, or both, associated with another vehicle (e.g., the other vehicles 106). The feature selection module 212 may compare the first vehicle specification and the second vehicle specification to determine whether the first vehicle 102 and the other vehicles 106 have a common software module, a common hardware module, or both. The feature selection module 212 may modify the second dataset 138 to include events that correspond to the common software module, the common hardware module, or both. For example, anomalies associated with the other vehicles 106 may have been detected and modifying the second dataset 138 based on the common software module, the common hardware module, or both, may enable detection of similar anomalies associated with the first vehicle 102.

In a particular illustrative embodiment, the model fitting module 214 may modify the baseline data 140 based on a statistical model. For example, the statistical model may indicate using average values (e.g., mean values, median values, or mode values). To illustrate, the model fitting module 214 may calculate a first average duration between the other ground systems 124 sending a plurality of software parts (or modification requests) to the other vehicles 106 and the other vehicles 106 receiving the software parts (or modification requests). As another example, the model fitting module 214 may calculate a second average duration between the other ground systems 124 sending a plurality of modification requests to the other vehicles 106 and the corresponding software parts being modified at the other vehicles 106. The audit system 108 may modify the second dataset 138 to indicate the first average value as a first threshold duration, the second average value as a second threshold duration, or both. As another example, the statistical model may use data indicating variation in the second dataset 138, such as standard deviation data. The audit system 108 may determine a first variation associated with the other ground systems 124 sending the plurality of software parts (or modification requests) to the other vehicles 106 and the other vehicles 106 receiving the software parts (or modification requests). As another example, the audit system 108 may determine a second variation associated with the other ground systems 124 sending the plurality of modification requests to the other vehicles 106 and the corresponding software parts being modified at the other vehicles 106. The audit system 108 may modify the first threshold duration of the second dataset 138 based on the first variation, modify the second threshold duration of the second dataset 138 based on the second variation, or both. The generated baseline data 140 may correspond to the baseline profile data 216.

Thus, the system 200 may enable anomaly detection in vehicle log data and ground system log data that includes chain-of-custody information. The first vehicle log data 122 of FIG. 1 and the first ground log data 120 may be analyzed based on the baseline data 140 to detect an anomaly in chain-of-custody information associated with the first software part 150 at the first vehicle 102. The baseline data 140 may be modified based on security requirements. In addition, or alternatively, the baseline data 140 may be modified based on another vehicle including a common hardware part, a common software part, or both, as the first vehicle 102. Hence, an automated log review may be dynamically updated to determine whether security requirements are being satisfied. In addition, the automated log review may be updated to include events associated with common parts (e.g., hardware, software, or both) between the first vehicle 102 and another vehicle (e.g., a vehicle for which anomalies have been detected).

Figure 3:
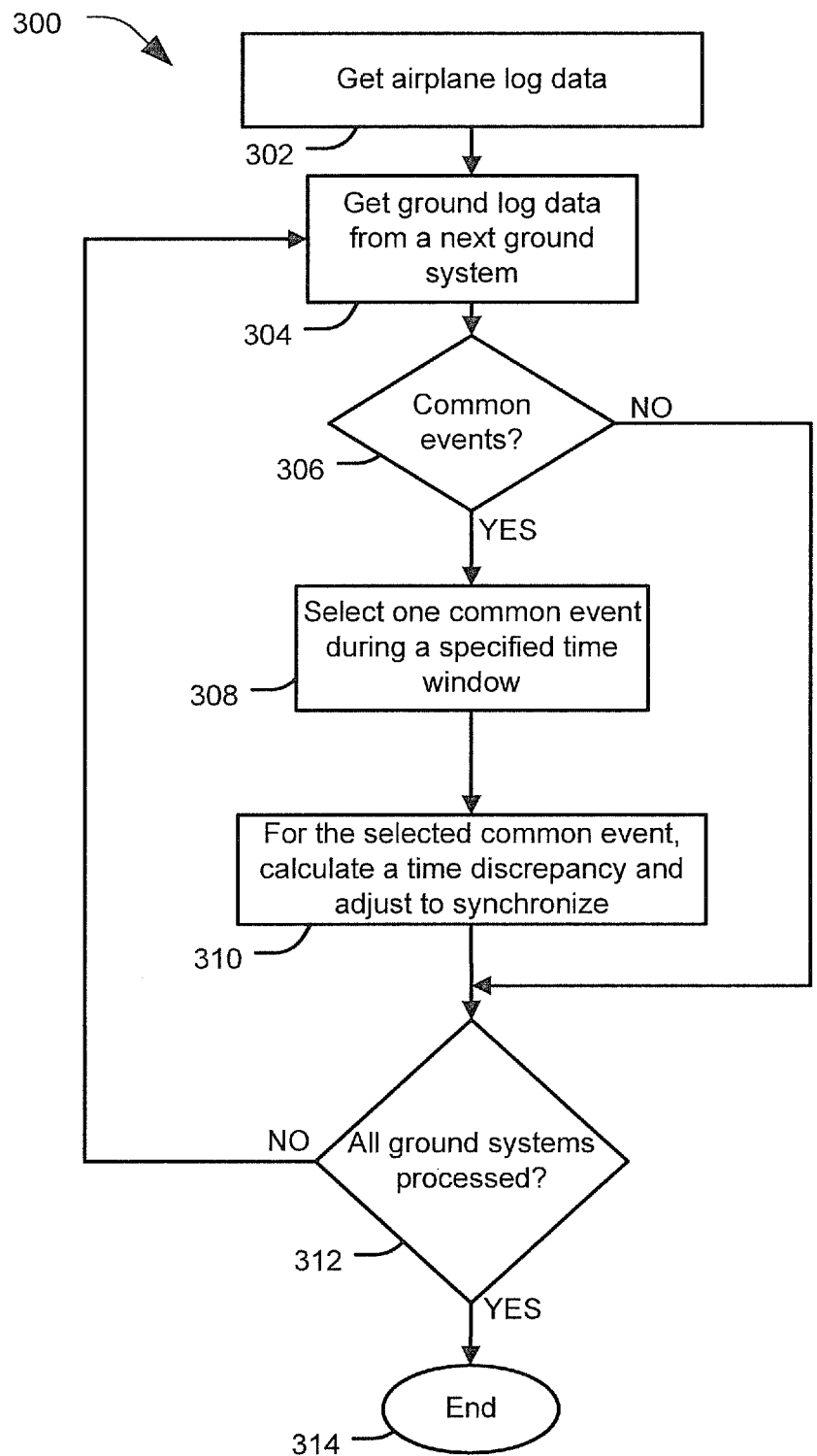
FIG. 3 is a flow chart illustrating a particular embodiment of a method of synchronizing vehicle log data and ground log data.

Referring to FIG. 3 a flow chart of a particular illustrative embodiment of a method of synchronizing vehicle log data and ground log data is shown and is generally designated 300. The method 300 of FIG. 3 may be executed by the audit system 108 of FIG. 1, the pre-process module 220 of FIG. 2, or both.

The method 300 may include getting airplane log data, at 302. Getting the airplane log data may include retrieving the airplane log data from memory, receiving the airplane log data via data communication from another device, or both. For example, the audit system 108 of FIG. 1 may receive the first vehicle log data 122 from the first vehicle 102.

The method 300 may also include getting ground log data from a next ground system, at 304. Getting the ground log data may include retrieving the ground log data from memory, receiving the ground log data via data communication from another device, or both. For example, the audit system 108 of FIG. 1 may receive the first ground log data 120 from the ground system 104.

The method 300 may further include determining whether the airplane log data and the ground log data include a common event, at 306. For example, the audit system 108 of FIG. 1 may determine whether the first vehicle log data 122 and the first ground log data 120 include a common event, e.g., based on an identifier included in each of the first vehicle log data 122 and the first ground log data 120.

When there is no common event, at 306, the method 300 may include determining whether all ground systems have been processed, at 312. For example, in response to determining that there are no common events between the first vehicle log data 122 and the first ground log data 120, the audit system 108 may determine whether ground log data of all ground systems (e.g., the other ground systems 124) that are to be considered by the audit system 108 have been processed.

When all ground systems have not been processed, at 312, the method 300 may proceed to 304. For example, the audit system 108 may receive the other ground log data 132 from the other ground systems 124. When all ground systems have been processed, at 312, the method 300 may end, at 314.

When there is a common event, at 306, the method 300 may include selecting one common event during a specified time window, at 308. For example, the audit system 108 may select an event corresponding to the ground system 104 sending a software part (e.g., the first software part 150) to the first vehicle 102 and the first vehicle 102 receiving the software part from the ground system 104. The time window may be determined based on a portion of the first vehicle log data 120 to be synchronized, may be subsequent to a time window used in a previous log review, or may be user specified.

The method 300 may also include calculating a time discrepancy and adjusting to synchronize for the selected common event, at 310. For example, the audit system 108 may calculate a time duration between a first timestamp of the first vehicle log data 122 and a second timestamp of the first ground log data 120. The first timestamp and the second timestamp may correspond to the selected common event. The audit system 108 may adjust timestamps of the first vehicle log data 122, the first ground log data 120, or both, based on the time duration. The method 300 may proceed to 312. Thus, the method 300 may be used to synchronize or time sequence events of the first vehicle log data 122 and ground log data (e.g., the first ground log data 120, the other ground log data 132, or both).

Figure 4:
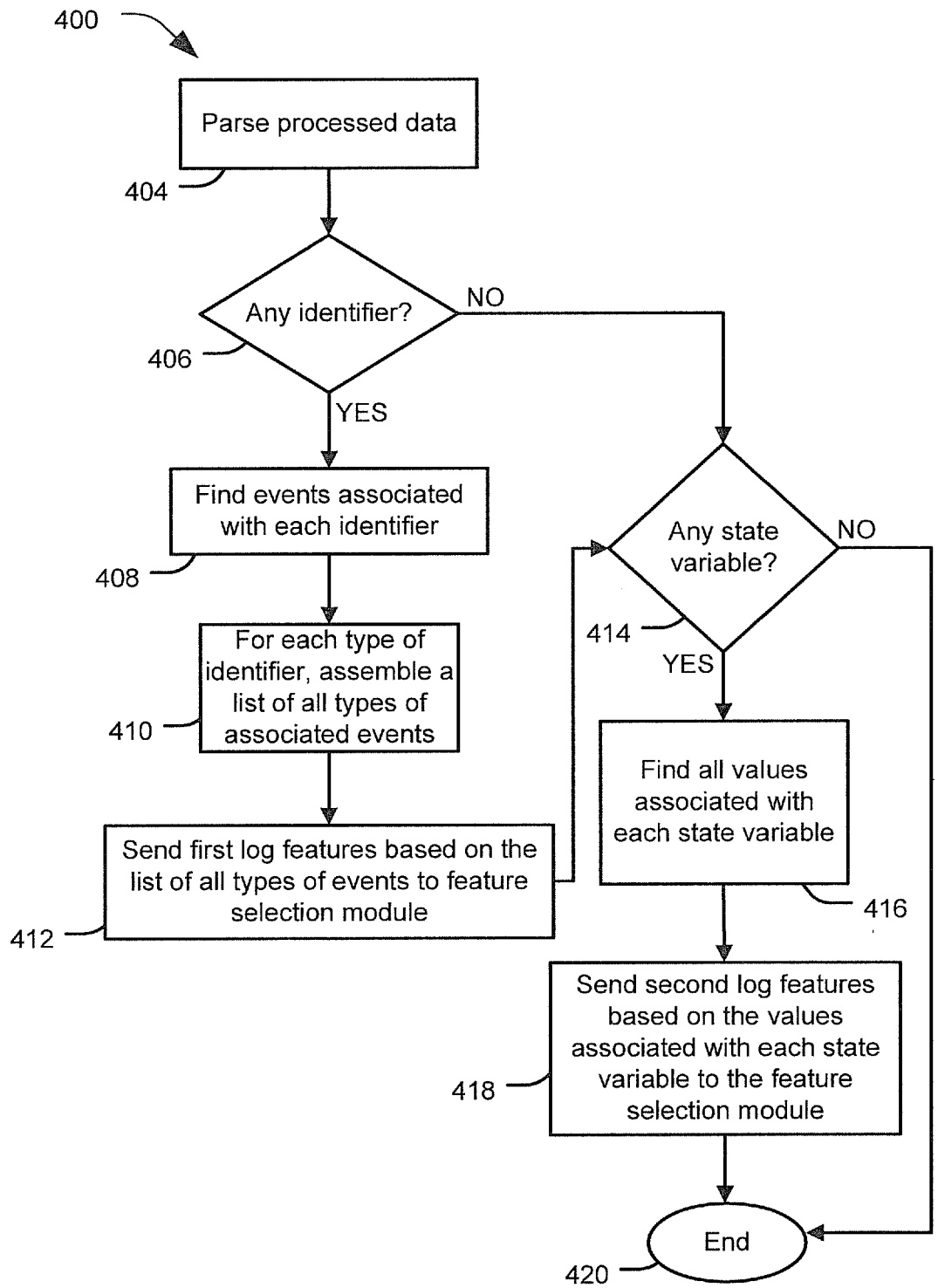
FIG. 4 is a flow chart illustrating a particular embodiment of a method of generating a dataset.

Referring to FIG. 4, a flow chart of a particular illustrative embodiment of a method of generating a dataset is shown and is generally designated 400. In a particular embodiment, the method 400 may be performed by the audit system 108 of FIG. 1. In a particular embodiment, the method 400 may be performed by the pre-process module 220 of FIG. 2, the feature creation module 210, the feature selection module 212, the model fitting module 214, or a combination thereof.

The method 400 may include parsing processed data, at 404. For example, the pre-process module 220 of FIG. 2 may parse the airplane network system and security log 202 (e.g., the other vehicle log data 130 of FIG. 1) and the ground system application log 204 (e.g., the other ground log data 132). Parsing may include analyzing the airplane network system and security log 202 and the ground system application log 204 to generate processed data that identifies logical components of the airplane network system and security log and the ground system application log 204. Examples of the logical components include an event type, a timestamp, an identifier, a vehicle status, and a modification status. Examples of the event type include sending a software part, receiving the software part, sending a modification request of the software part, receiving a modification request of the software part, and modification (e.g., installation, deletion, upgrade, update, or the like) of the software part. Examples of the identifier include a software part identifier, a hardware part identifier (e.g., an identifier of a hardware part that is associated with the software part), an event identifier, a device identifier (e.g., an identifier of a device that the software part (or the modification request) is received from, an identifier of a device that the software part (or the modification request) is sent to, a maintenance computer identifier, a vehicle identifier, a ground system identifier, an identifier of a device that authorized or initiated the transfer (or modification) of the software part), a location identifier, and a user identifier (e.g., an identifier of a user who initiated or authorized the transfer (or modification) of the software part). The airplane network system and security log 202 and the ground system application log 204 may be analyzed based on rules (e.g., grammar rules). For example, the rules may indicate how the logical components may be identified by the pre-process module 220. To illustrate, the rules may indicate that a particular character indicates a beginning of data related to a particular event, another particular character indicates an end of data related to the particular event, a format of a timestamp, a format of an identifier, a format of an event type, a format of a vehicle status, a format of a modification status, or a combination thereof. Based on the rules, the pre-process module 220 may determine that an event type, a timestamp, an identifier, a vehicle status, a modification status, or a combination thereof, identified in data related to a particular event are associated with the particular event.

The method 400 may correspond to feature creation, as described with reference to the feature creation module 210 of FIG. 1. The method 400 may be performed by the audit system 108 of FIG. 1, the feature creation module 210 of FIG. 2, or both. The method 400 may correspond to a machine learning process that generates features based on analyzing logs.

For example, feature creation may include generating features based on identifiers included in the logs. The method 400 may include determining whether the processed data includes any identifier, at 406. For example, the feature creation module 210 of FIG. 2 may determine whether the processed data corresponding to the other vehicle log data 130 and the other ground log data 132 includes any identifier. When the processed data does not include any identifier, at 406, the method 400 may proceed to 414.

Generating features based on identifiers may include identifying events associated with each identifier included in the logs. For example, when the processed data includes an identifier, at 406, the method 400 may include finding events associated with each identifier, at 408. To illustrate, the processed data may indicate that the other vehicle log data 130 includes an identifier of the other software part 160. The feature creation module 210 may find events associated with the identifier, such as an event associated with the other ground systems 124 sending the other software part 160 to the other vehicles 106, an event associated with the other vehicles 106 receiving the other software part 160, an event associated with the other ground systems 124 sending a modification request to modify the other software part 160, an event associated with the other vehicles 106 receiving the modification request, an event associated with the other software part 160 being modified at the other vehicles 106, or a combination thereof.

Generating features based on identifiers may include identifying all types of events associated with each type of identifier. Examples of types of events may include sending a software part, receiving the software part, sending a modification request, receiving a modification request, modification (e.g., installation, deletion, upgrade, update, or the like) of the software part, or a combination thereof. Examples of types of identifiers may include a software part identifier type, a hardware part identifier type, an event identifier type, a device identifier type, a location identifier type, and a user identifier type. For example, the method 400 may include assembling a list of all types of associated events for each type of identifier, at 410. To illustrate, the feature creation module 210 may assemble a list of all types of events associated with a software part identifier type based on data related to the other software part 160. For example, the data related to the other software part 160 may indicate receiving the other software part 160, sending the other software part 160, receiving a modification request to modify the other software part 160, sending the modification request, and modification of the other software part 160. Based on the data related to the other software part 160, the feature creation module 210 may generate a list of event types (e.g., a receiving a software part event type, a sending a software part event type, a receiving a modification request event type, a sending a modification request event type, a modification event type), each of which may be associated with a software part identifier type.

Feature creation may include sending the types of events associated with each type of identifier to a feature selection module. The method 400 may include sending first log features based on the list of all types of events to feature selection module 212, at 412. For example, the feature creation module 210 may generate the second dataset 138 of FIG. 1 based on the list of types of events sent to the feature selection module 212. To illustrate, the second dataset 138 may include data describing the list of types of events associated with a software part identifier type. The second dataset 138 may also include data related to the types of events associated with the software part identifier type. For example, the second dataset 138 may indicate a threshold duration between sending and receiving a software part based on a time duration between the other ground systems 124 sending the other software part 160 to the other vehicles 106 and the other vehicles 106 receiving the other software part 160. As another example, the second dataset 138 may indicate a threshold duration between sending and receiving a modification request based on a time duration between the other ground systems 124 sending a modification request to modify the other software part 160 to the other vehicles 106 and the other vehicles 106 receiving the modification request. As another example, the second dataset 138 may indicate a threshold duration between sending a modification request and a software part being modified based on a time duration between the other ground systems 124 sending the modification request to the other vehicles 106 and the other software part 160 being modified at the other vehicles 106. The feature creation module 210 may send the second dataset 138 to the feature selection module 212.

As another example, feature creation may include generating features based on state variables. The method 400 may include determining whether the processed data includes any state variables, at 414. For example, the feature creation module 210 may determine, based on the processed data, whether the other vehicle log data 130 includes any variables indicating a state of the other vehicles 106. Examples of the state of the vehicle include a weight-on-wheels status, a tilt status, a ground speed status, an air speed status, a parking brake status, an airport distance status indicative of a distance between the first vehicle and an airport, or a combination thereof. As another example, the feature creation module 210 may determine, based on the processed data, whether the other vehicle log data 130 includes any variables indicating a modification status associated with modifying the other software part 160 at the other vehicles 106. When the processed data does not include any state variables, at 414, the method 400 may end, at 420.

Generating features based on state variables may include identifying all values associated with each state variable. For example, when the processed data includes state variables, at 414, the method 400 may include finding all values associated with each state variable, at 416. To illustrate, the other vehicle log data 130 may indicate a first value (e.g., true) of a weight-on-wheels status of the other vehicles 106 at a first time. The other vehicle log data 130 may indicate a second value (e.g., false) of the weight-on-wheels status of the other vehicles 106 at a second time. The feature creation module 210 may find the first value and the second value associated with the weight-on-wheels status of the vehicle. As another example, the other vehicle log data 130 may indicate a first value (e.g., succeeded) of a modification status associated with modifying the other software part 160 at the other vehicles 106 at a first time. The other vehicle log data 130 may indicate a second value (e.g., failed) of the modification status associated with modifying the other software part 160 at the other vehicles 106 at a second time. The feature creation module 210 may find the first value and the second value associated with the modification status associated with the vehicle.

Feature creation may include sending the values associated with each state variable to a feature selection module. The method 400 may include sending second log features based on the values associated with each state variable to the feature selection module, at 418. For example, the feature creation module 210 may generate or modify the second dataset 138 to indicate the values (e.g., true and false) associated with the weight-on-wheels status of the other vehicles 106. The second dataset 138 may also indicate an expected value associated with the weight-on-wheels status of the vehicle when a software part is received based on the weight-on-wheels status of the other vehicles 106 when the other software part 160 was received. As another example, the feature creation module 210 may generate or modify the second dataset 138 to indicate the values (e.g., succeeded or failed) associated with the modification status associated with the other vehicles 106. The second dataset 138 may also indicate an expected value associated with the modification status associated with the vehicle when a software part is modified based on the modification status of the other vehicles 106 when the other software part 160 was modified. The feature creation module 210 may send the second dataset 138 to the feature selection module 212. The method 400 may end, at 420.

Figure 5:
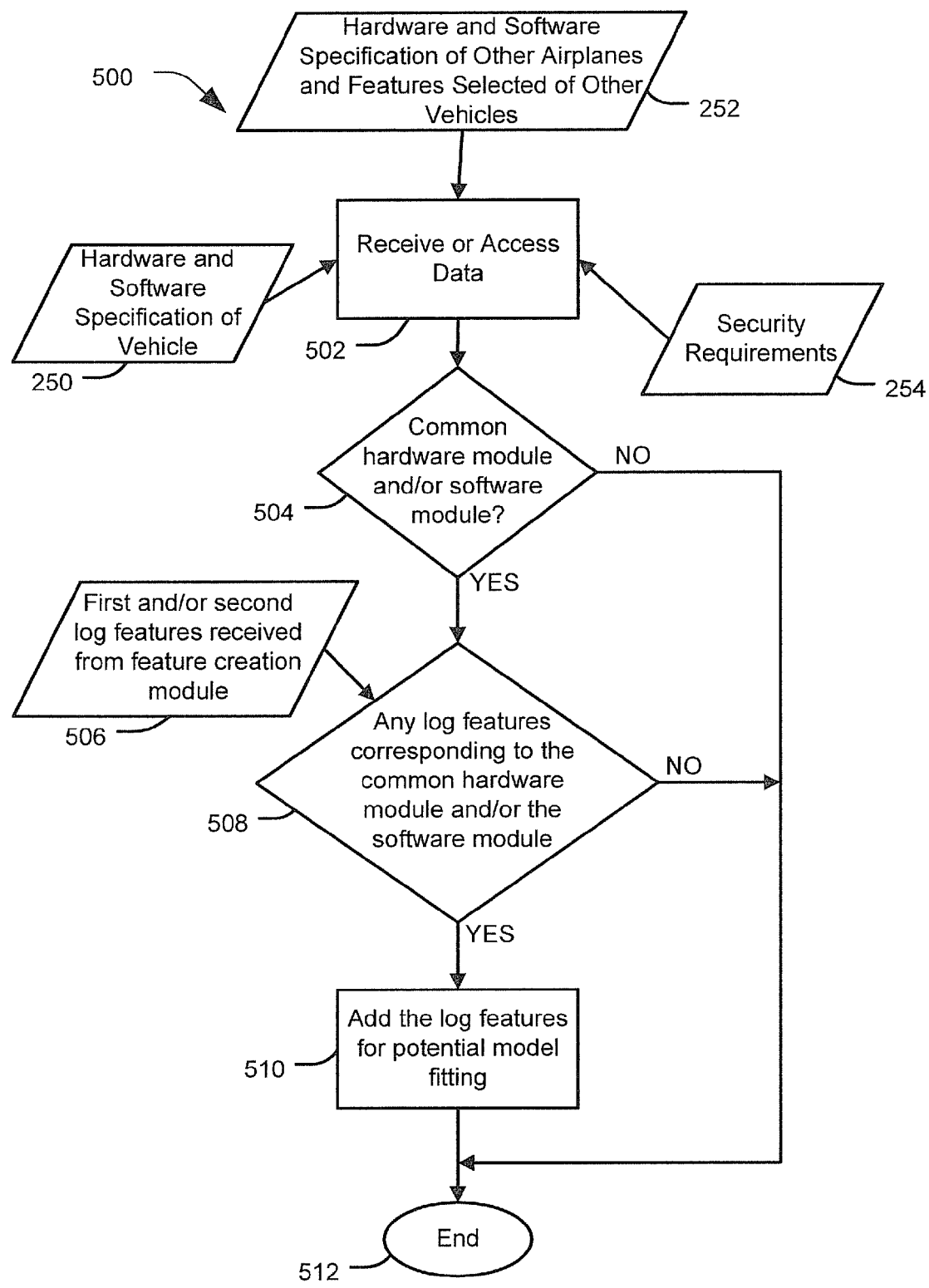
FIG. 5 is a flow chart illustrating a particular embodiment of a method of generating baseline data.

Referring to FIG. 5, a flow chart of a particular illustrative embodiment of a method of generating baseline data is shown and is generally designated 500. The method 500 may be performed by the audit system 108, the feature selection module 212 of FIG. 2, or both. Features may be selected to generate the baseline data based on whether a vehicle has a common hardware module as another vehicle or a common software module as another vehicle, based on security requirements, or both. For example, anomalies associated with the other vehicle may have been detected and a purpose of the log review may be to verify whether there are anomalies related to hardware or software modules that the vehicle (e.g., the first vehicle 102) has in common with the other vehicle. Another purpose of the log review may be to verify whether the security requirements are being satisfied.

The method 500 may include receiving or accessing data, at 502. The data may include hardware and software specification of vehicle 250, specification of other airplanes and features selected of other vehicles 252, security requirements 254, or a combination thereof.

The method 500 may include determining whether a common hardware and/or software module is present based on the hardware and the software specification of the vehicle 250 and the specification and features selected of other vehicles 252, at 504. For example, the feature selection module 212 may determine whether there is a common hardware and/or software module of each of the first vehicle 102 and the other vehicles 106 based on the vehicle specification data 144. When there is no common hardware or software module, at 504, the method 500 may end, at 512.

When there is a common hardware or software module, at 504, the method 500 may include determining whether there are any log features corresponding to the common hardware module or the common software module, at 508. The determination may be based on first and/or second log features 506 received from a feature creation module. For example, the feature selection module 212 may determine whether the second dataset 138 includes data corresponding to the common hardware and/or software module. When there are no log features, at 508, the method 500 may end, at 512.

When there are log features corresponding to the common hardware module, the common software module, or both, at 508, the method 500 may include adding the log features for potential model fitting, at 510. For example, when the first and/or second log features 506 received from the feature creation module (e.g., the second dataset 138 or a portion of the second dataset 138) correspond to the common hardware and/or software module, the first and/or second log features 506 may be added to the baseline data 140 for model fitting. The method 500 may end, at 512.

Figure 6:
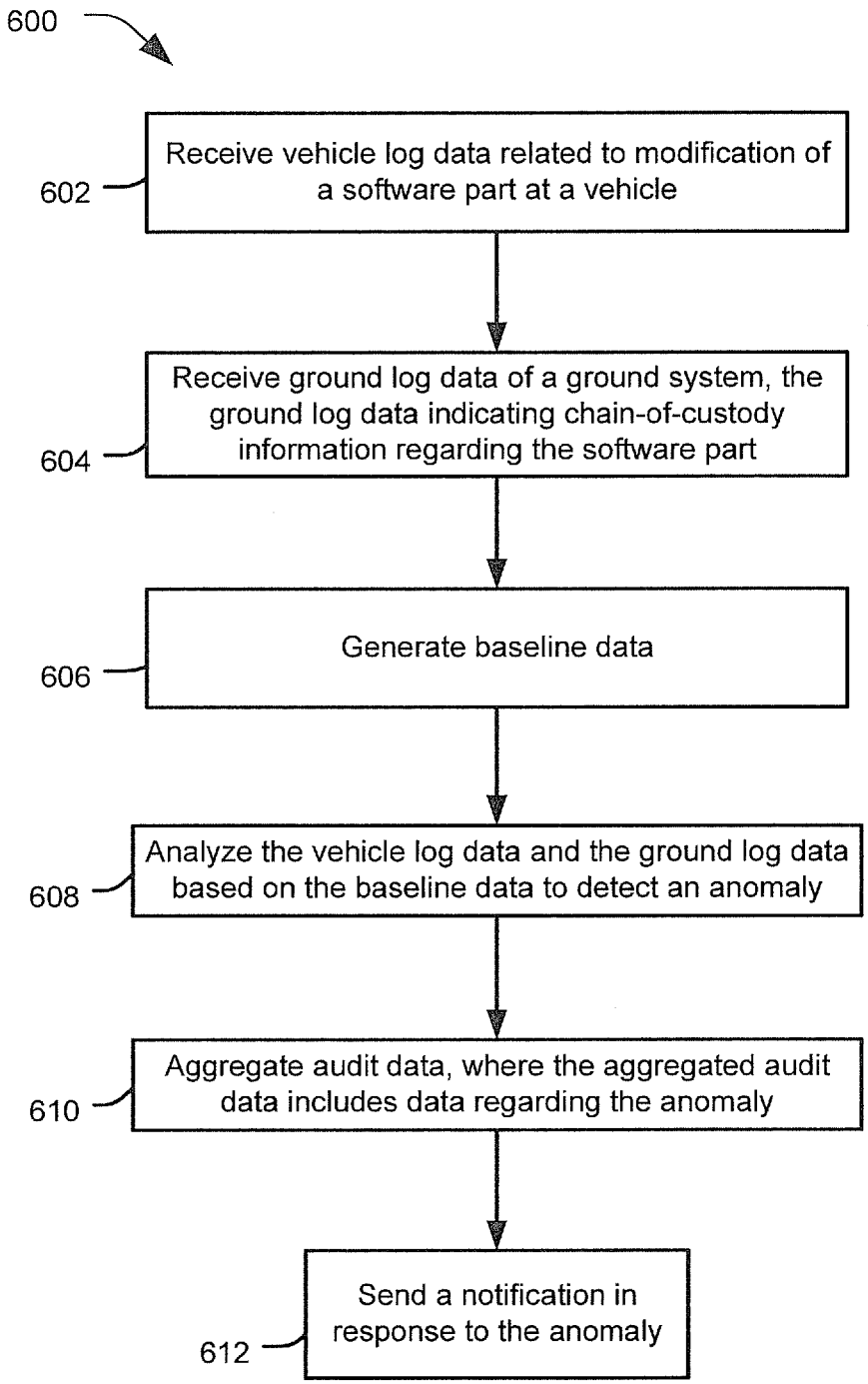
FIG. 6 is a flow chart illustrating a particular embodiment of a method of detecting an anomaly in chain-of-custody information.

Referring to FIG. 6, a flow chart illustrating a particular embodiment of a method of detecting an anomaly in chain-of-custody information is shown and is generally designated 600. The method 600 may be performed by the audit system 108, the anomaly detection module 222 of FIG. 2, or both. Logs of a vehicle and one or more ground systems may be reviewed and analyzed to detect any anomalies in chain-of-custody information related to a software part. The analysis may be based on baseline data, e.g., the baseline data may indicate features to be analyzed and expected values.

The method 600 may include receiving vehicle log data related to modification of a software part at a vehicle, at 602. For example, the audit system 108 of FIG. 1 may receive the first vehicle log data 122. The first vehicle log data 122 may be related to modification of the first software part 150 at the first vehicle 102.

The method 600 may also include receiving ground log data of a ground system, at 604. The ground log data may indicate chain-of-custody information regarding the software part. For example, the audit system 108 of FIG. 1 may receive the first ground log data 120 from the ground system 104. The first ground log data 120 may indicate chain-of-custody information regarding the first software part 150.

The method 600 may further include generating baseline data, at 606. For example, the audit system 108 of FIG. 1 may generate the baseline data 140 based on the other vehicle log data 130 and other ground log data 132.

The method 600 may also include analyzing the vehicle log data and the ground log data based on the baseline data to detect an anomaly, at 608. For example, the audit system 108 of FIG. 1 may analyze the first vehicle log data 122 and the first ground log data 120 based on the baseline data 140 to detect an anomaly. To illustrate, the audit system 108 may detect that a first duration between the ground system 104 sending the first software part 150 to the first vehicle 102 and the first vehicle 102 receiving the first software part 150 from the ground system 104 exceeds a threshold duration indicated by the baseline data 140.

The method 600 may further include aggregating audit data, where the aggregated audit data includes data regarding the anomaly, at 610. For example, the audit system 108 of FIG. 1 may aggregate audit data, such as by software part. To illustrate, the aggregated audit data may indicate anomalies associated with a plurality of vehicles that received the first software part 150. The aggregated audit data may include data regarding the anomaly detected in association with the first vehicle 102.

The method 600 may also include sending a notification in response to the anomaly, at 612. For example, the audit system 108 may send a message regarding the anomaly (e.g., to a user, to another device, or both), display an alert regarding the anomaly (e.g., at an output device), or both.

Figure 7:
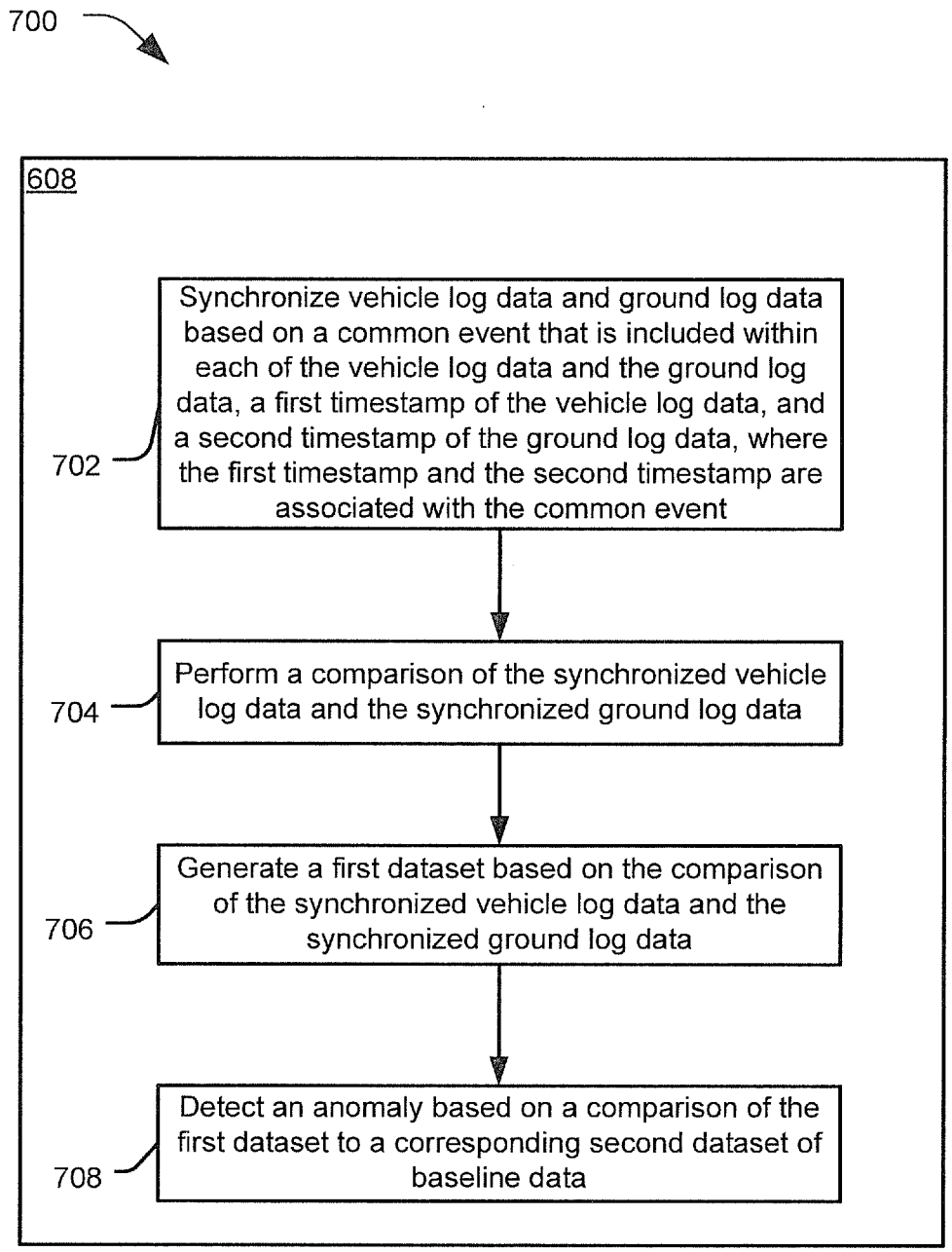
FIG. 7 is a flow chart illustrating a particular embodiment of a method of detecting an anomaly in chain-of-custody information.

Referring to FIG. 7, a flow chart illustrating a particular embodiment of a method of detecting an anomaly in chain-of-custody information is shown and is generally designated 700. In a particular embodiment, the method 700 may correspond to operation 608 of FIG. 6.

The method 700 may include synchronizing vehicle log data and ground log data based on a common event that is included within each of the vehicle log data and the ground log data, a first timestamp of the vehicle log data, and a second timestamp of the ground log data, at 702. The first timestamp and the second timestamp may be associated with the common event. For example, the audit system 108 of FIG. 1 may synchronize the first vehicle log data 122 and the first ground log data 120 based on a first timestamp of the first vehicle log data 122 and a second timestamp of the first ground log data 120. The second timestamp may correspond to when the ground system 104 sent a software part to the first vehicle 102 and the first timestamp may correspond to when the first vehicle 102 received the software part from the ground system 104.

The method 700 may also include performing a comparison of the synchronized vehicle log data and the synchronized ground log data, at 704. For example, the audit system 108 of FIG. 1 may compare the synchronized first vehicle log data 122 and the synchronized first ground log data 120.

The method 700 may further include generating a first dataset based on the comparison of the synchronized vehicle log data and the synchronized ground log data, at 706. For example, the audit system 108 may generate the first dataset 136 based on the comparison of the synchronized first vehicle log data 122 and the synchronized first ground log data 120.

The method 700 may also include detecting an anomaly based on a comparison of the first dataset to a corresponding second dataset of baseline data, at 708. For example, the audit system 108 may detect the anomaly based on a comparison of the first dataset 136 and the second dataset 138.

Figure 8:
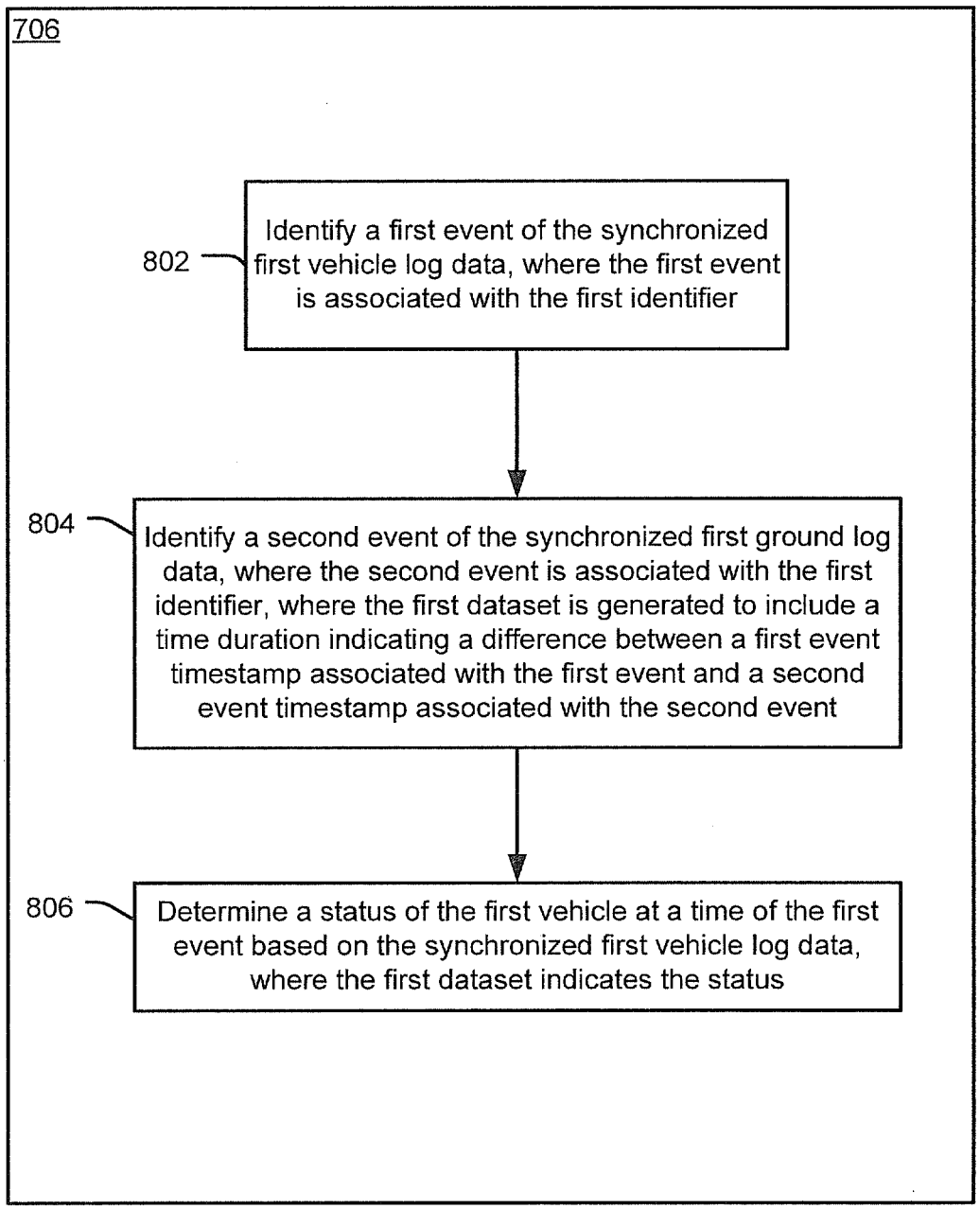
FIG. 8 is a flow chart illustrating a particular embodiment of a method of generating a dataset.

Referring to FIG. 8, a flow chart illustrating a particular embodiment of a method of generating a dataset is shown and is generally designated 800. In a particular embodiment, the method 800 may correspond to the operation 706 of FIG. 7.

The method 800 may include identifying a first event of the synchronized first vehicle log data, where the first event is associated with the first identifier, at 802. For example, the audit system 108 may identify an event of the synchronized first vehicle log data 122 corresponding to the first vehicle 102 receiving the first software part 150 from the ground system 104. The identified event may be associated with an event identifier.

The method 800 may also include identifying a second event of the synchronized first ground log data, where the second event is associated with the first identifier, at 804. The first dataset may be generated to include a time duration indicating a difference between a first event timestamp associated with the first event and a second event timestamp associated with the second event. For example, the audit system 108 may identify an event of the synchronized first ground log data 120 associated with the event identifier corresponding to the ground system 104 sending the first software part 150 to the first vehicle 102. The audit system 108 may generate the first dataset 136 to indicate a duration between a timestamp associated with the event of the synchronized first vehicle log data 122 and a timestamp associated with the event of the first ground log data 120.

The method 800 may further include determining a status of the first vehicle at a time of the first event based on the synchronized first vehicle log data, where the first dataset indicates the status, at 806. For example, the audit system 108 may determine a weight-on-wheels status of the first vehicle 102 at the time of receiving the first software part 150 from the ground system 104. The audit system 108 may update the first dataset 136 to indicate the weight-on-wheels status (e.g., false).

Figure 9:
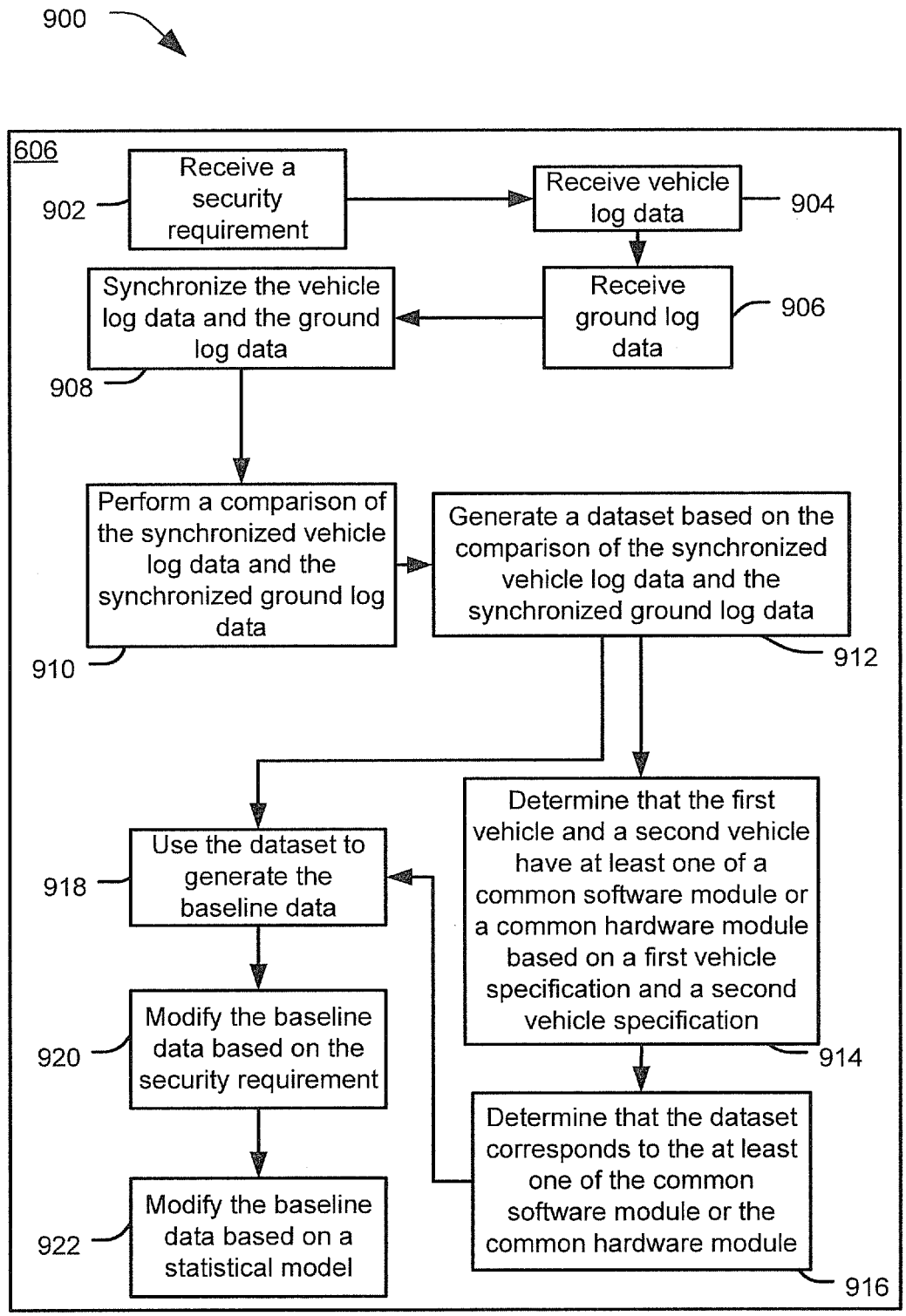
FIG. 9 is a flow chart illustrating a particular embodiment of a method of generating baseline data.

Referring to FIG. 9, a flow chart illustrating a particular embodiment of a method of generating baseline data is shown and is generally designated 900. In a particular embodiment, the method 900 may correspond to operation 606 of FIG. 6.

The method 900 may include receiving a security requirement, at 902. For example, the audit system 108 of FIG. 1 may receive the security requirements 146 of FIG. 1.

The method 900 may also include receiving vehicle log data, at 904. For example, the audit system 108 of FIG. 1 may receive the other vehicle log data 130 from the other vehicles 106.

The method 900 may further include receiving ground log data, at 906. For example, the audit system 108 of FIG. 1 may receive the other ground log data 132 from the other ground systems 124.

The method 900 may also include synchronizing the vehicle log data and the ground log data, at 908. For example, the audit system 108 of FIG. 1 may synchronize the other vehicle log data 130 and the other ground log data 132 based on a first timestamp of the other vehicle log data 130 associated with a first event and a second timestamp of the other ground log data 132 associated with a corresponding second event.

The method 900 may further include performing a comparison of the synchronized vehicle log data and the synchronized ground log data, at 910. For example, the audit system 108 of FIG. 1 may perform a comparison of the synchronized other vehicle log data 130 and the synchronized other ground log data 132.

The method 900 may also include generating a dataset based on the comparison of the synchronized vehicle log data and the synchronized ground log data, at 912. For example, the audit system 108 of FIG. 1 may generate the second dataset 138 based on the comparison of the synchronized other vehicle log data 130 and the synchronized other ground log data 132.

The method 900 may proceed to 918 or to 914. At 914, the method 900 may include determining that the first vehicle and a second vehicle have at least one of a common software or a common hardware module based on a first vehicle specification and a second vehicle specification. For example, the audit system 108 of FIG. 1 may include determining whether the first vehicle 102 and the other vehicles 106 have a common software, a common hardware module, or both, based on the vehicle specification data 144.

The method 900 may further include determining that the dataset corresponds to the common software module, the common hardware module, or both, at 916. For example, the audit system 108 may determine that the second dataset 138 corresponds to the common software module, the common hardware module, or both. The method 900 may proceed to 918.

The method 900 may further include using the dataset to generate the baseline data, at 918. For example, the audit system 108 may use the second dataset 138 to generate the baseline data 140.

The method 900 may also include modifying the baseline data based on the security requirement, at 920. For example, the audit system 108 may modify the baseline data 140 based on the security requirements 146.

The method 900 may further include modifying the baseline data based on a statistical model, at 922. For example, the audit system 108 may modify the baseline data 140 based on a statistical model.

Figure 10:
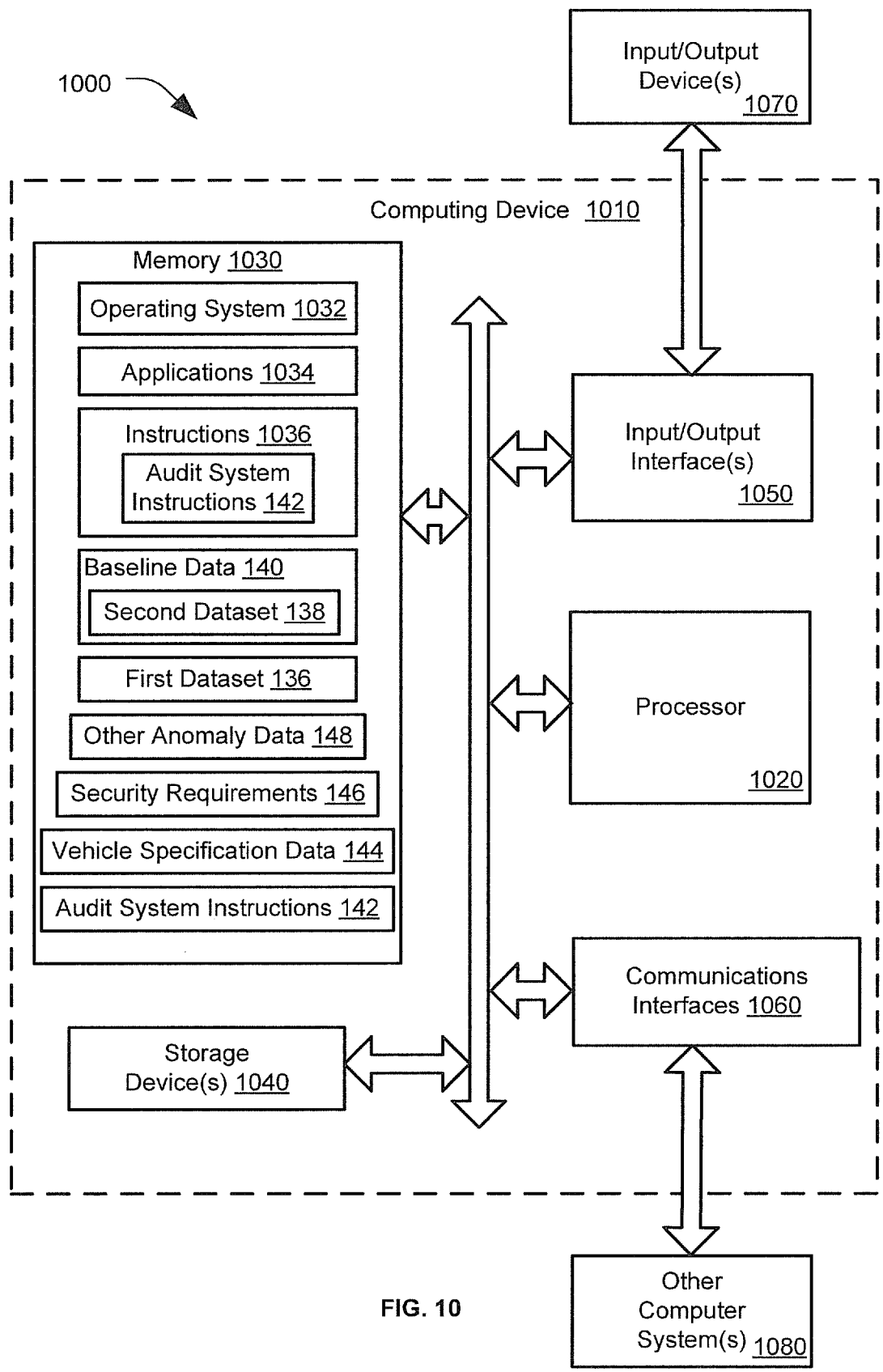
FIG. 10 is a block diagram of a particular illustrative embodiment of a computing environment to detect an anomaly in chain-of-custody information.

FIG. 10 is a block diagram of a computing environment 1000 including a general purpose computing device 1010 to support embodiments of computer-implemented methods and computer-executable program instructions (or code) according to the present disclosure. For example, the computing device 1010, or portions thereof, may execute instructions to analyze vehicle log data, ground system log data, or both, to detect an anomaly in chain-of-custody information. In another example, the computing device 1010, or portions thereof, may execute instructions to receive vehicle log data related to modification of a software part at a vehicle, to receive ground log data of a ground system, to generate baseline data, to analyze the vehicle log data and the ground log data based on the baseline data to detect an anomaly, to aggregate audit data, and to send a notification in response to the anomaly. In a particular embodiment, the computing device 1010 may include, be included with, or correspond to the audit system 108 of FIG. 1.

The computing device 1010 may include a processor 1020. In a particular embodiment, the processor 1020 may correspond to the processor 170 of FIG. 1. Within the computing device 1010, the processor 1020 may communicate with memory 1030, one or more storage devices 1040, one or more input/output interfaces 1050, one or more communications interfaces 1060, or a combination thereof.

The memory 1030 may include volatile memory devices (e.g., random access memory (RAM) devices), nonvolatile memory devices (e.g., read-only memory (ROM) devices, programmable read-only memory, and flash memory), or both. In a particular embodiment, the memory 1030 may correspond to the memory 180 of FIG. 1. The memory 1030 may include an operating system 1032, which may include a basic/input output system for booting the computing device 1010 as well as a full operating system to enable the computing device 1010 to interact with users, other programs, and other devices. The memory 1030 may include one or more application programs 1034, such as an audit system application, e.g., an application that is executable to detect an anomaly in chain-of-custody information. The memory 1030 may include instructions 1036 that are executable by the processor 1020, such as the audit system instructions 142 to detect an anomaly in chain-of-custody information. The memory 1030 may include the baseline data 140, the first dataset 136, the second dataset 138, the other anomaly data 148, the security requirements 146, the vehicle specification data 144, the audit system instructions 142, or a combination thereof.

The processor 1020 may also communicate with one or more storage devices 1040. For example, the one or more storage devices 1040 may include nonvolatile storage devices, such as magnetic disks, optical disks, or flash memory devices. The storage devices 1040 may include both removable and non-removable memory devices. The storage devices 1040 may be configured to store an operating system, applications, and program data. In a particular embodiment, the memory 1030, the storage devices 1040, or both, include tangible, non-transitory computer-readable media.

The processor 1020 may also communicate with one or more input/output interfaces 1050 that enable the computing device 1010 to communicate with one or more input/output devices 1070 to facilitate user interaction. The input/output interfaces 1050 may include serial interfaces (e.g., universal serial bus (USB) interfaces or IEEE 11094 interfaces), parallel interfaces, display adapters, audio adapters, and other interfaces. The input/output devices 1070 may include keyboards, pointing devices, displays, speakers, microphones, touch screens, and other devices. The processor 1020 may detect interaction events based on user input received via the input/output interfaces 1050. Additionally, the processor 1020 may send a display to a display device via the input/output interfaces 1050.

The processor 1020 may communicate with other computer systems 1080 via the one or more communications interfaces 1060. The one or more communications interfaces 1060 may include wired Ethernet interfaces, IEEE 802 wireless interfaces, Bluetooth communication interfaces, or other network interfaces. The other computer systems 1080 may include host computers, servers, workstations, and other computing devices. For example, the other computer systems 1080 may include the first vehicle 102 of FIG. 1, the ground system 104 of FIG. 1, the other vehicles 106 of FIG. 1, the other ground systems 124 of FIG. 1, or a combination thereof. In a particular embodiment, data (e.g., the baseline data 140, the first dataset 136, the second dataset 138, the other anomaly data 148, the security requirements 146, the vehicle specification data 144, the first vehicle log data 122 of FIG. 1, the other vehicle log data 130 of FIG. 1, the first ground log data 120 of FIG. 1, the other ground log data 132 of FIG. 1, or a combination thereof) may be distributed. In a particular embodiment, one or more of the modules of FIG. 2 may be included in one or more computing devices, the data (e.g., the baseline data 140, the first dataset 136, the second dataset 138, the other anomaly data 148, the security requirements 146, the vehicle specification data 144, the first vehicle log data 122 of FIG. 1, the other vehicle log data 130 of FIG. 1, the first ground log data 120 of FIG. 1, the other ground log data 132 of FIG. 1, or a combination thereof) may be included in the one or more computing devices, or both.

Thus, in particular embodiments, a computer system may be able to detect an anomaly in chain-of-custody information. For example, the instructions 1036 may be executable by the processor 1020 to receive vehicle log data related to modification of a software part at a vehicle, to receive ground log data of a ground system, to generate baseline data, to analyze the vehicle log data and the ground log data based on the baseline data to detect an anomaly, to aggregate audit data, and to send a notification in response to the anomaly.

Embodiments described above illustrate but do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
receiving, at a processor of an audit system, first vehicle log data related to modification of a first software part at a first vehicle;
receiving, at the processor, first ground log data of a first ground system, the first ground log data indicating first chain-of-custody information regarding the first software part;
analyzing, at the processor, the first vehicle log data and the first ground log data based on baseline data to detect an anomaly, wherein the baseline data includes baseline log data that corresponds to a modification of a second software part without any detected anomalies, wherein the anomaly indicates at least one of a gap between the first chain-of-custody information and second chain-of-custody information received from a second ground system, that the first software part was received out-of-order by the first ground system, or that the first software part was forwarded out-of-order by the first ground system, and wherein said analyzing further comprises:

synchronizing the first vehicle log data and the first ground log data based on a common event that is included within each of the first vehicle log data and the first ground log data, a first timestamp of the first vehicle log data, and a second timestamp of the first ground log data to generate synchronized first vehicle log data and synchronized first ground log data, wherein the first timestamp and the second timestamp are associated with the common event, performing a comparison of the synchronized first vehicle log data and the synchronized first ground log data, and generating a first dataset based on the comparison; and sending, from the processor, a notification in response to detecting the anomaly.

2. The method of claim 1, wherein the first chain-of-custody information includes at least one of a timestamp associated with an event and an identifier associated with an event.

3. The method of claim 2, wherein the event includes at least one of the first ground system receiving the first software part from a first device or the first ground system forwarding the first software part to a second device.

4. The method of claim 2, wherein the identifier includes at least one of an event identifier, a device identifier, a software part identifier, a hardware part identifier, a user identifier, a maintenance computer identifier, a vehicle identifier, or a ground system identifier.

5. The method of claim 1, further comprising:

identifying a first event of the synchronized first vehicle log data, wherein the first event is associated with a first identifier; and identifying a second event of the synchronized first ground log data, wherein the second event is associated with the first identifier, wherein the first dataset is generated to indicate a time duration indicating a difference between a first event timestamp associated with the first event and a second event timestamp associated with the second event.

6. The method of claim 5, further comprising determining a status of the first vehicle at a time of the first event based on the synchronized first vehicle log data, wherein the first dataset indicates the status.

7. The method of claim 1, further comprising detecting the anomaly based on a comparison of the first dataset to a corresponding second dataset of the baseline data.

8. The method of claim 7, wherein the anomaly is detected in response to the comparison of the first dataset to the second dataset indicating that a first time duration of the first dataset exceeds a corresponding second time duration of the second dataset.

9. The method of claim 8, wherein the first time duration indicates a time difference between the first ground system sending the first software part to the first vehicle and the first vehicle receiving the first software part from the first ground system and wherein the second time duration indicates a threshold duration.

10. The method of claim 7, wherein the anomaly is detected in response to the comparison of the first dataset to the second dataset indicating that a first state value of the first dataset does not correspond to a second state value of the second data set and wherein the first state value indicates a status of the first vehicle at a time of a first event.

11. The method of claim 10, wherein the first vehicle includes an aircraft, wherein the first state value indicates a first weight-on-wheels status of the first vehicle, and wherein the second state value indicates a second weight-on-wheels status.

12. The method of claim 1, further comprising aggregating audit data to generate aggregated audit data, wherein the aggregated audit data includes data regarding the anomaly.

13. The method of claim 1, further comprising, in response to detecting the anomaly, modifying the baseline data based on the anomaly.

14. A system comprising:

a processor; and a memory storing instructions that, when executed by the processor, cause the processor to perform operations comprising:

receiving first vehicle log data related to modification of a first software part at a first vehicle;

receiving first ground log data of a first ground system, the first ground log data indicating first chain-of-custody information regarding the first software part;

analyzing the first vehicle log data and the first ground log data based on baseline data to detect an anomaly, wherein the baseline data includes baseline log data that corresponds to a modification of a second software part without any detected anomalies, wherein the anomaly indicates at least one of a gap between the first chain-of-custody information and second chain-of-custody information received from a second ground system, that the first software part was received out-of-order by the first ground system, or that the first software part was forwarded out-of-order by the first ground system, and wherein said analyzing further comprises:

synchronizing the first vehicle log data and the first ground log data based on a common event that is included within each of the first vehicle log data and the first ground log data, a first timestamp of the first vehicle log data, and a second timestamp of the first ground log data to generate synchronized first vehicle log data and synchronized first ground log data, wherein the first timestamp and the second timestamp are associated with the common event, performing a comparison of the synchronized first vehicle log data and the synchronized first ground log data, and generating a first dataset based on the comparison; and sending a notification in response to detecting the anomaly.

15. The system of claim 14, wherein the operations further comprise:

receiving second vehicle log data related to modification of the second software part at a second vehicle;

receiving second ground log data, the second ground log data indicating second chain-of-custody information regarding the second software part;

synchronizing the second vehicle log data and the second ground log data to generate synchronized second vehicle log data and synchronized second ground log data;

performing a comparison of the synchronized second vehicle log data and the synchronized second ground log data;

generating a dataset based on the comparison of the synchronized second vehicle log data and the synchronized second ground log data, wherein the dataset indicates that the modification of the second software part is without a detected anomaly; and generating the baseline data based on the dataset.

16. The system of claim 15, wherein the operations further comprise determining that the first vehicle and a second vehicle have at least one of a common software module or a common hardware module based on a first vehicle specification of the first vehicle and a second vehicle specification of the second vehicle.

17. The system of claim 15, wherein the operations further comprise:
- modifying the baseline data to include a threshold time period based on a security requirement; and
- modifying the baseline data based on a statistical model.

18. A non-transitory computer-readable storage device storing instructions that, when executed by a processor, cause the processor to perform operations comprising:
- receiving first vehicle log data related to modification of a first software part at a first vehicle;
- receiving first ground log data of a first ground system, the first ground log data indicating first chain-of-custody information regarding the first software part;
- analyzing the first vehicle log data and the first ground log data based on baseline data to detect an anomaly, wherein the baseline data includes baseline log data that corresponds to a modification of a second software part without any detected anomalies, wherein the anomaly indicates at least one of a gap between the first chain-of-custody information and second chain-of-custody information received from a second ground system, that the first software part was received out-of-order by the first ground system, or that the first software part was forwarded out-of-order by the first ground system, and wherein said analyzing further comprises:
  - synchronizing the first vehicle log data and the first ground log data based on a common event that is included within each of the first vehicle log data and the first ground log data, a first timestamp of the first vehicle log data, and a second timestamp of the first ground log data to generate synchronized first vehicle log data and synchronized first ground log data, wherein the first timestamp and the second timestamp are associated with the common event,
- performing a comparison of the synchronized first vehicle log data and the synchronized first ground log data, and generating a first dataset based on the comparison; and
- sending a notification in response to detecting the anomaly.

19. The non-transitory computer-readable storage device of claim 18, wherein the first vehicle includes an aircraft.

* * * * *